United States Patent
Kapla et al.

(10) Patent No.: US 10,177,704 B2
(45) Date of Patent: Jan. 8, 2019

(54) SNAP-ON RAIL ASSEMBLY

(71) Applicant: Sunpower Corporation, San Jose, CA (US)

(72) Inventors: John Kapla, Mill Valley, CA (US); Kyle Feldmann, Richmond, CA (US); Bryan Cusick, Berkeley, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 15/497,748

(22) Filed: Apr. 26, 2017

(65) Prior Publication Data
US 2018/0316300 A1   Nov. 1, 2018

(51) Int. Cl.
*H02S 20/23* (2014.01)
*F16B 5/12* (2006.01)

(52) U.S. Cl.
CPC .............. *H02S 20/23* (2014.12); *F16B 5/126* (2013.01); *F16B 5/123* (2013.01)

(58) Field of Classification Search
CPC ........... H02S 20/23; F16B 5/126; F16B 5/123
See application file for complete search history.

(56) References Cited

U.S. PATENT DOCUMENTS

| | | | | |
|---|---|---|---|---|
| 8,640,400 B2* | 2/2014 | Liebendorfer | ......... | F24J 2/5207 136/251 |
| 9,097,443 B2* | 8/2015 | Liu | ......... | F24J 2/5258 |
| 9,813,012 B2* | 11/2017 | Wentworth | ............. | H02S 20/23 |
| 2008/0302407 A1* | 12/2008 | Kobayashi | ............. | F24J 2/5211 136/251 |
| 2011/0126881 A1* | 6/2011 | Hong | ..................... | F24J 2/5205 136/244 |
| 2011/0209745 A1* | 9/2011 | Korman | ................. | F24J 2/5207 136/251 |
| 2011/0239546 A1* | 10/2011 | Tsuzuki | ................. | F24J 2/4614 52/11 |
| 2011/0302857 A1* | 12/2011 | McClellan | .......... | E04D 13/0445 52/173.3 |

* cited by examiner

*Primary Examiner* — Phi D A
*Assistant Examiner* — Omar Hijaz
(74) *Attorney, Agent, or Firm* — Oblon, McClelland, Maier & Neustadt, L.L.P.

(57) ABSTRACT

A mounting assembly to mount frames on a mounting surface, the mounting assembly having rails that supports the frames, each rail having an internal side adjacent with an internal recess, and an external side opposite to the internal side with lip; and roof mounting assemblies to affix the rails onto the mounting surface. Each mounting assembly having a mounting block that is fixable to the mounting surface, a mounting plate that is fixable to the mounting block, and a pair rail snap brackets formed at extremities of the mounting plate that receives and locks the rails in place, each rail snap bracket of the pair of rail snap brackets having a pair of notches that lodges in the internal recess of the rail to lock the rail in place and a hook that receives the lip.

19 Claims, 21 Drawing Sheets

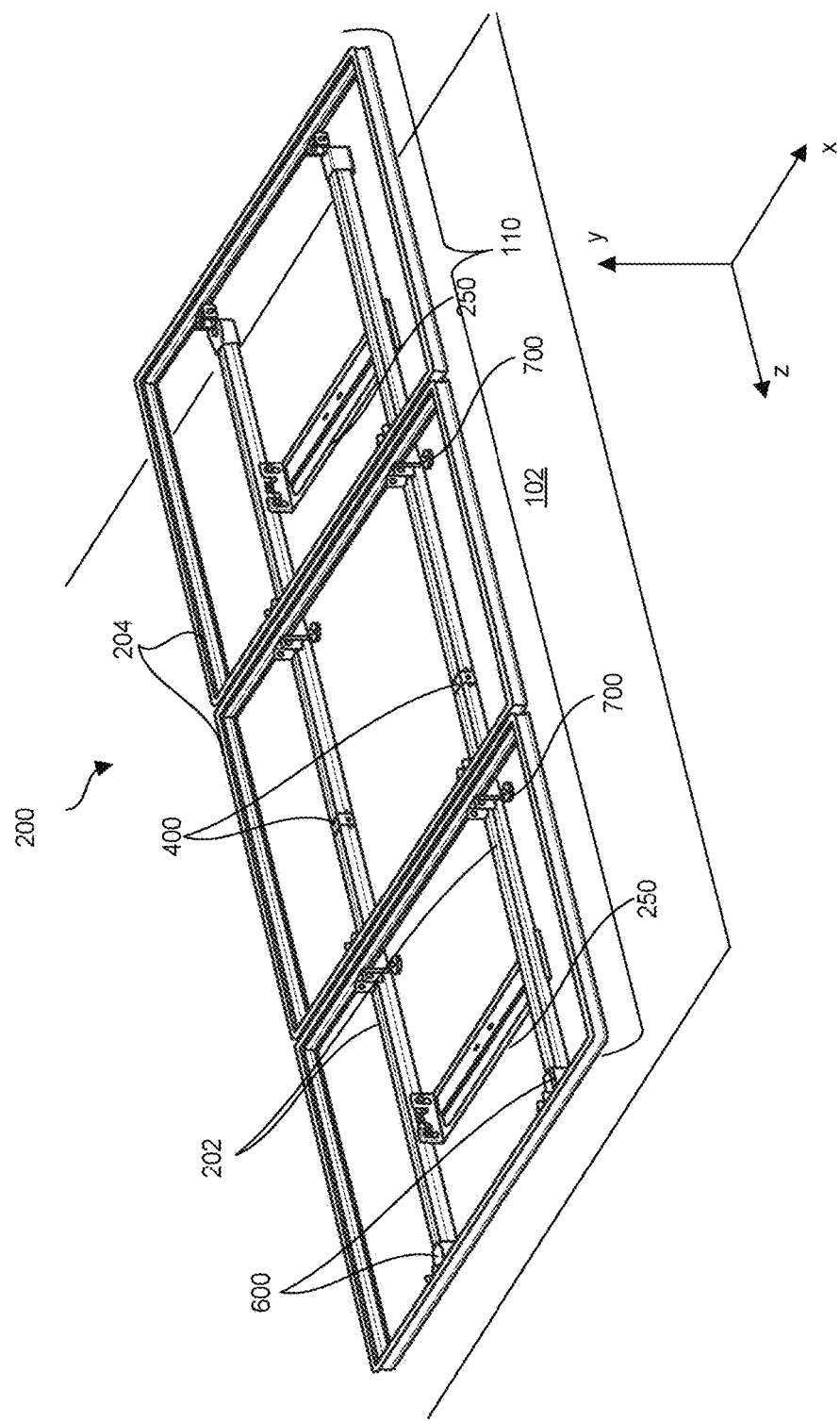

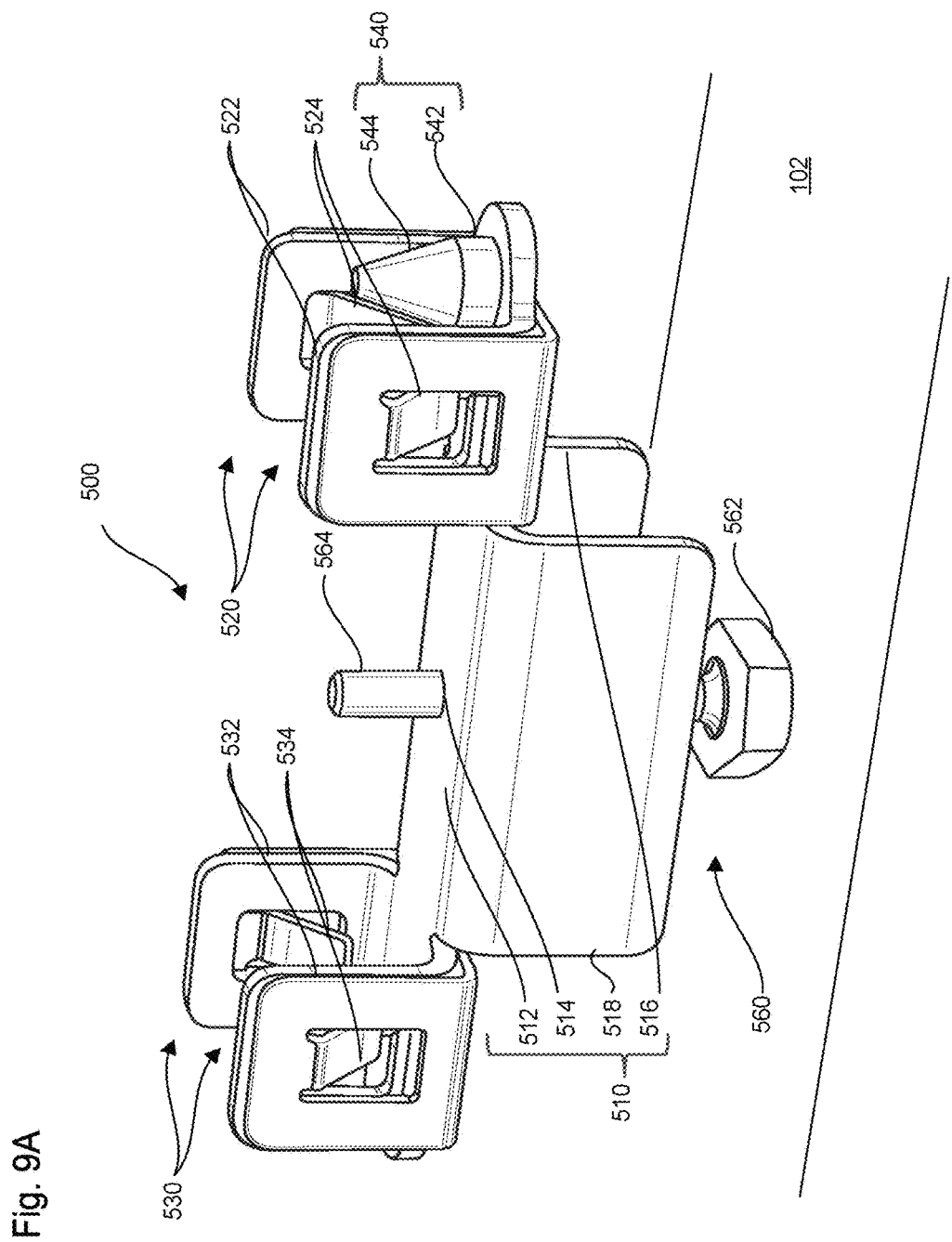

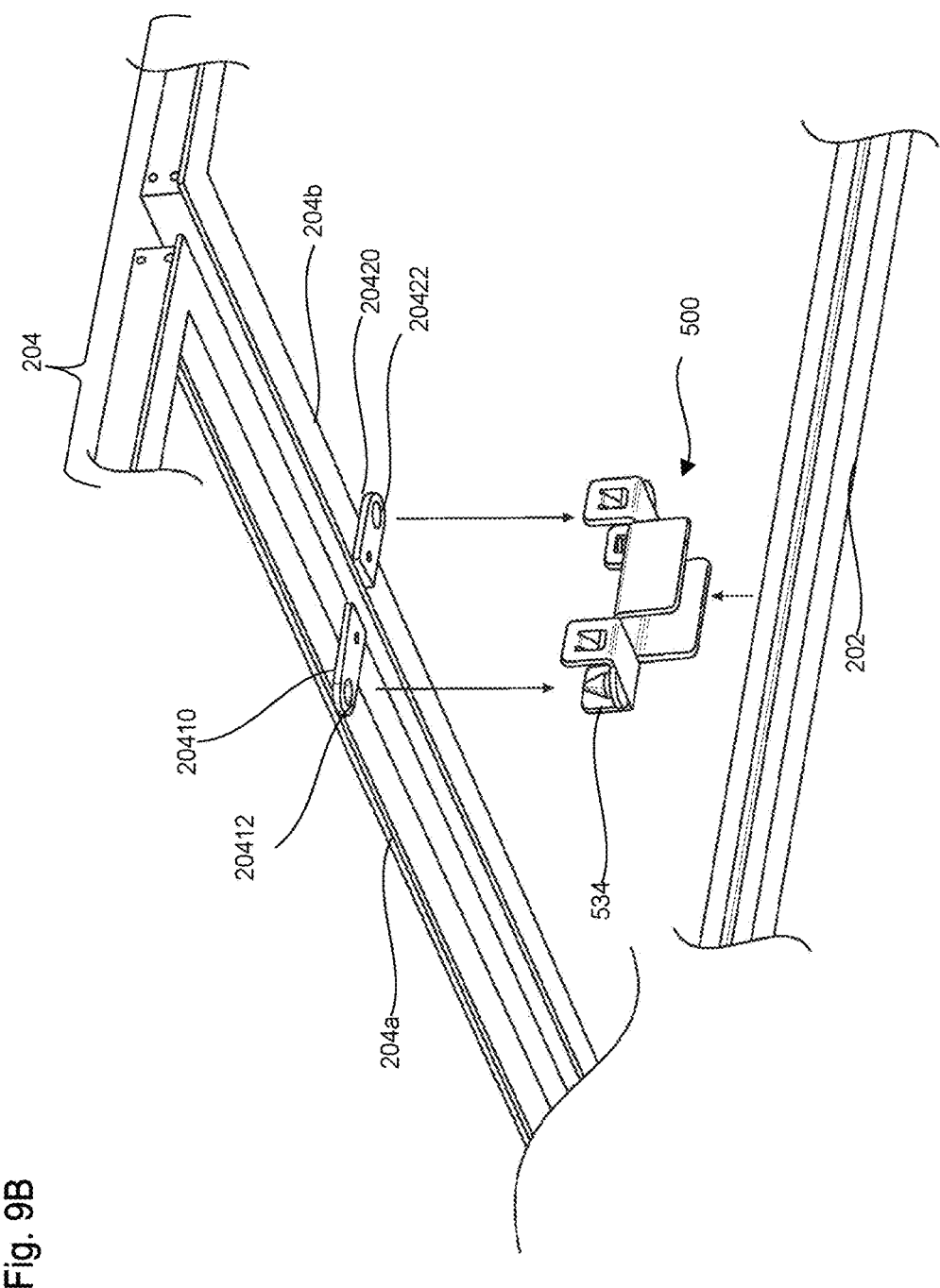

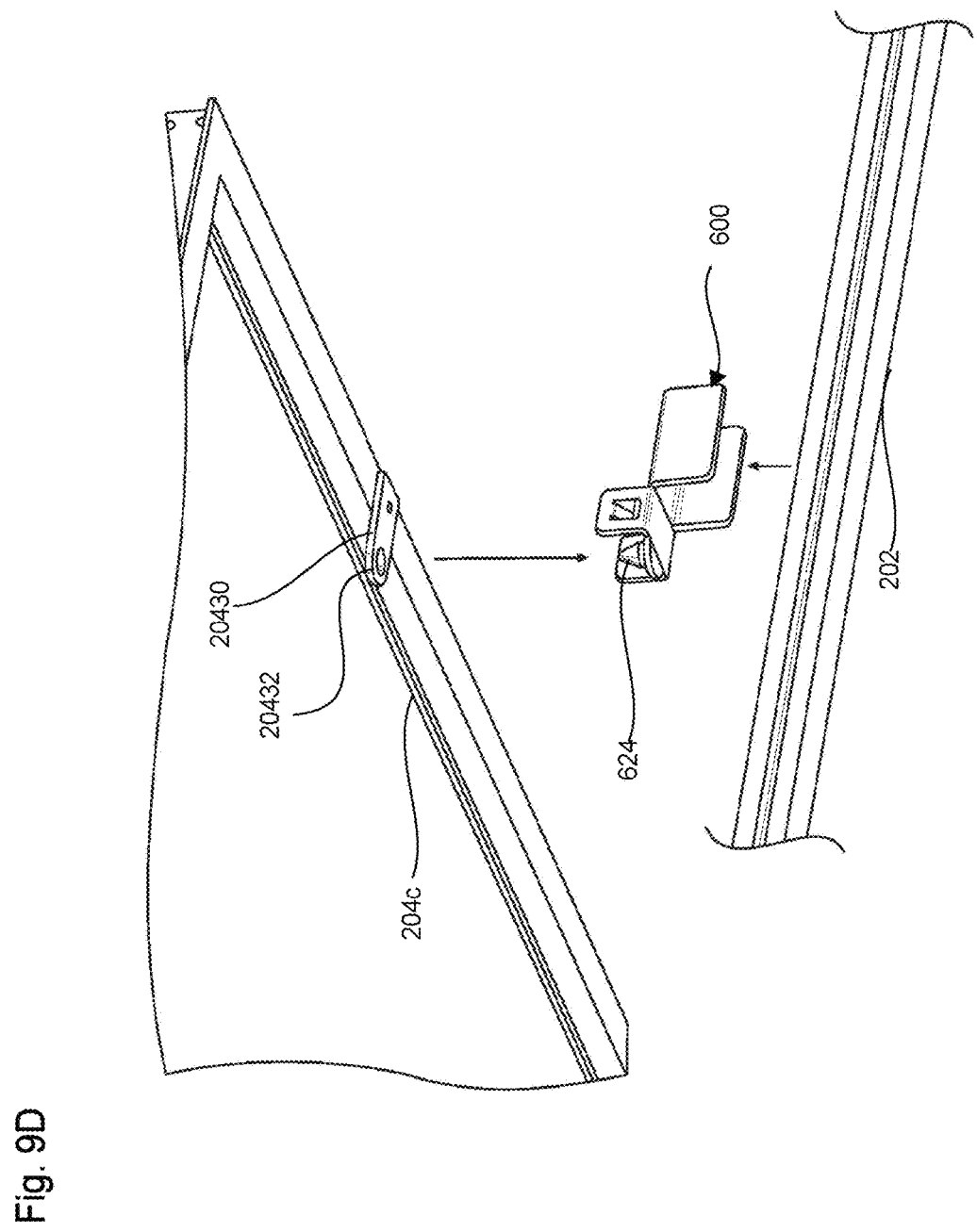

SNAP-ON RAIL ASSEMBLY

BACKGROUND

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial, or industrial applications in which multiple solar modules are desirable for generating substantial amounts of energy, with the rooftop of the structure providing a convenient mounting surface at which the solar modules can be placed. For many such mounting surfaces, though, it is of utmost importance to maintain a moisture barrier to prevent precipitation or other water from penetrating the mounting surface. However, many mounting systems require penetrating the mounting surface to engage with the superstructure of the roof, which might weaken the moisture barrier. In addition, many mounting systems require custom tools, multiple tools, and complex procedures and/or instruction for the installing the mounting system which can make the installation difficult, costly, and time consuming. Accordingly, there remains a continuing need for improved systems and methods for mounting fixtures to mounting surfaces securely while also ensuring a sufficient moisture barrier.

BRIEF DESCRIPTION OF THE DRAWINGS

To easily identify the discussion of any particular element or act, the most significant digit or digits in a reference number refer to the figure number in which that element is first introduced.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4A is a perspective view of the mounting assembly supporting frames of the solar modules.

FIG. 9A is perspective view of a center frame connector alone;

FIG. 9B is perspective view of a center frame connector mounted on the rail and supporting the solar modules;

FIG. 9D is a perspective view of the end frame connector mounted onto the rail and supporting the solar modules;

SUMMARY

Figure 1:
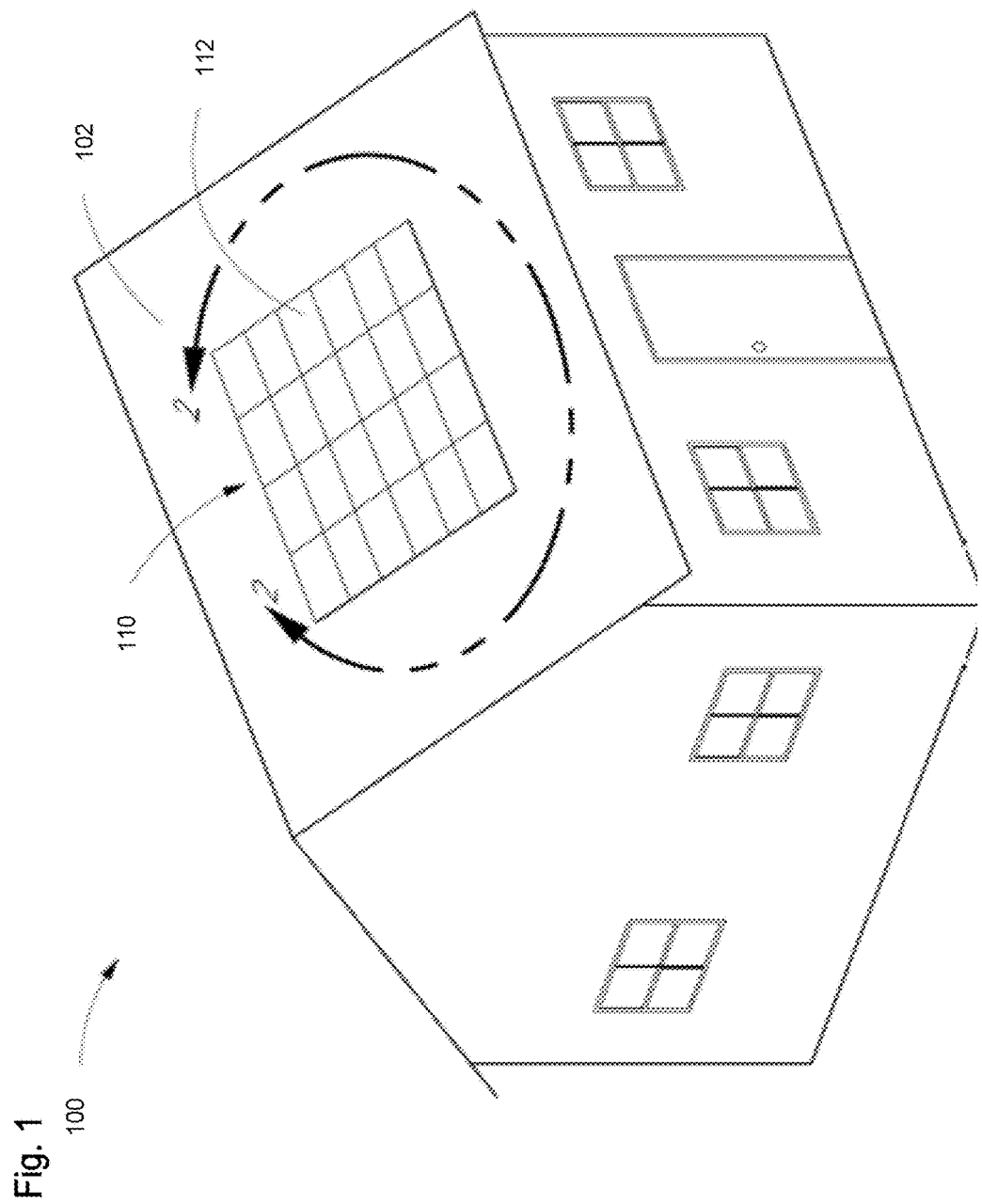
FIG. 1 is a schematic perspective view of a solar power system comprising an array of solar modules mounted to a support structure.

Embodiments may include a mounting assembly to mount frames on a mounting. The mounting assembly can include a plurality of rails that supports the frames, each rail of the plurality of rails including: an open end, a top side with a top recess, an internal side adjacent to the top side with internal recess, and an external side opposite to the internal side with a lip that protrudes outwardly; and a plurality of roof mounting assemblies to affix the plurality of rails onto the mounting surface, each mounting assembly of the plurality of mounting assemblies including: a mounting block that is fixable to the mounting surface, a mounting plate that is fixable to the mounting block, and a pair of rail snap brackets formed at extremities of the mounting plate that receives and locks the plurality of rails in place, each rail snap bracket of the pair of rail snap brackets including: a first support wall that protrudes from the mounting plate, a pair of notches that protrudes from the first support wall and that lodges in the internal recess of the rail to lock the rail in place, a second support wall that protrudes from the first support wall between the pair of notches, and a hook that is placed along an outward extremity of the second support wall and that receives the lip of the rail.

Embodiments may include a mounting assembly to mount frames on a mounting. The mounting assembly can include a plurality of rails that supports the frames, each rail of the plurality of rails including: an open end, a top side with a top recess, an internal side adjacent to the top side with internal recess, and an external side opposite to the internal side with a lip that protrudes outwardly; a plurality of roof mounting assemblies to affix the plurality of rails onto the mounting surface, each mounting assembly of the plurality of mounting assemblies including: a mounting block that is fixable to the mounting surface, a mounting plate that is fixable to the mounting block, and a pair rail snap brackets formed at extremities of the mounting plate that receives and locks the plurality of rails in place, each rail snap bracket including: a first support wall that protrudes from the mounting plate, a pair of notches that protrudes from the first support wall and that lodges in the internal recess of the rail to lock the rail, a second support wall that protrudes from the first support wall between the pair of notches, a hook that is placed along an outward extremity of the second support wall and receives the lip of the rail; and a plurality of frame connectors to affix the frames onto the plurality of rails, each frame connector of the plurality of frame connectors including: a guide rail that seats on the top side of the rail, at least one pair of notches that protrudes from the guide rail and locks the frames, and a frame connector fastener with a head that anchors the top recess of the top side and a body that threads into the guide rail.

Embodiments may include a mounting assembly to mount frames on a mounting. The mounting assembly can include a plurality of rails that support the frames, each rail of the plurality of rails can include an open end, a top side with a top recess, an internal side adjacent to the top side with internal recess, and an external side opposite to the internal side with a lip that protrudes outwardly; a plurality of rail connectors to connect the plurality of rails from end to end, each rail connector of the plurality of rail connectors including: an inner rail that receives a first open end of a first rail of the plurality of rails and a second open end of a second rail of the plurality of rails; a plurality of roof mounting assemblies to affix the plurality of rails onto the mounting surface, each mounting assembly of the plurality of mounting assemblies including: a mounting block that is fixed to the mounting surface, a mounting plate that is fixed to the mounting block, and a pair rail snap brackets formed at extremities of the mounting plate that receives and locks the plurality of rails in place, each rail snap bracket including: a first support wall that protrudes from the mounting plate, a pair of notches that protrudes from the first support wall and that lodges in the internal recess of the rail to lock the rail, a second support wall that protrudes from the first support wall between the pair of notches, a hook that is placed along an outward extremity of the second support wall and receives the lip of the rail; and a plurality of frame connectors to affix the frames onto the plurality of rails.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Figure 2:
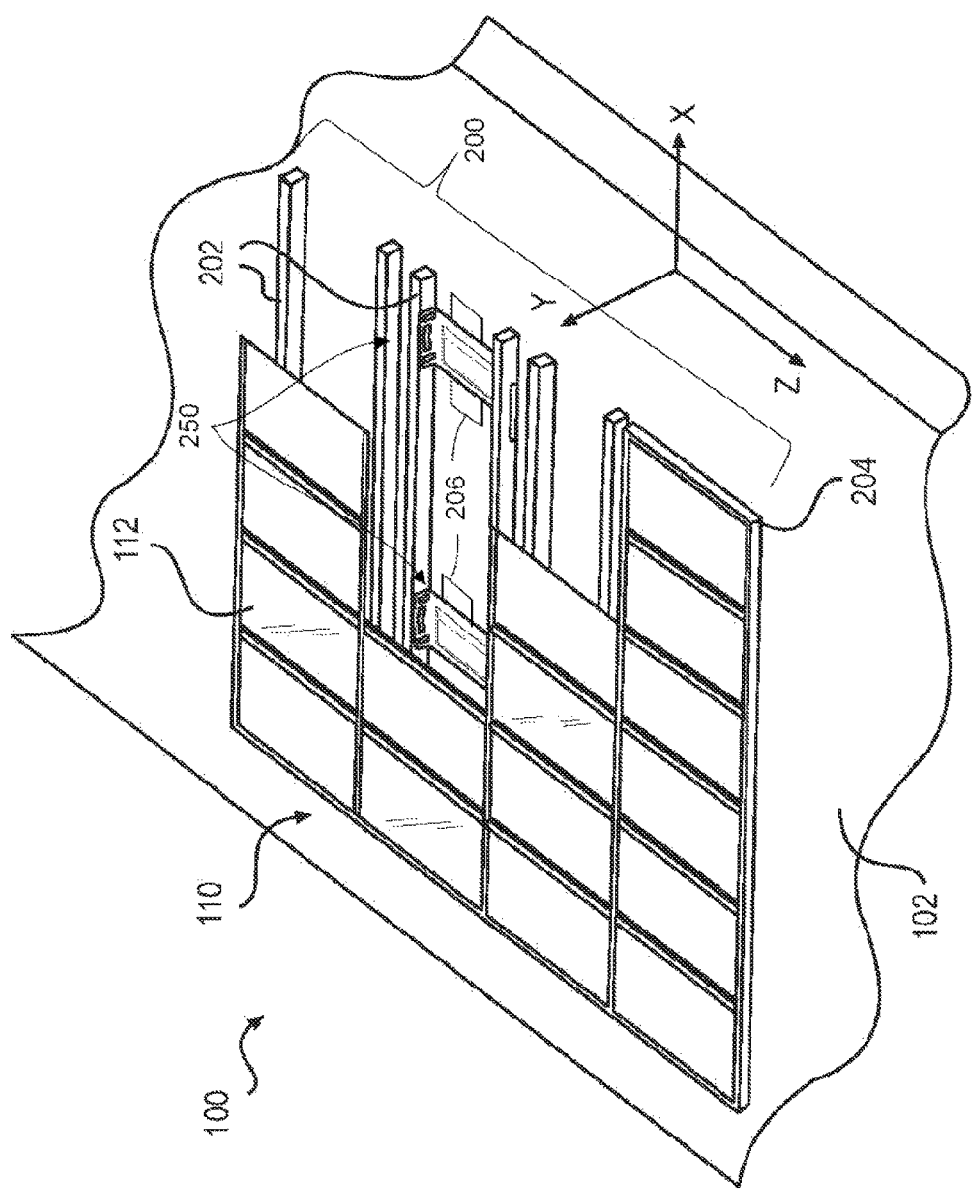
FIG. 2 is a magnified perspective view of the solar power system illustrated in FIG. 1.
Figure 3:
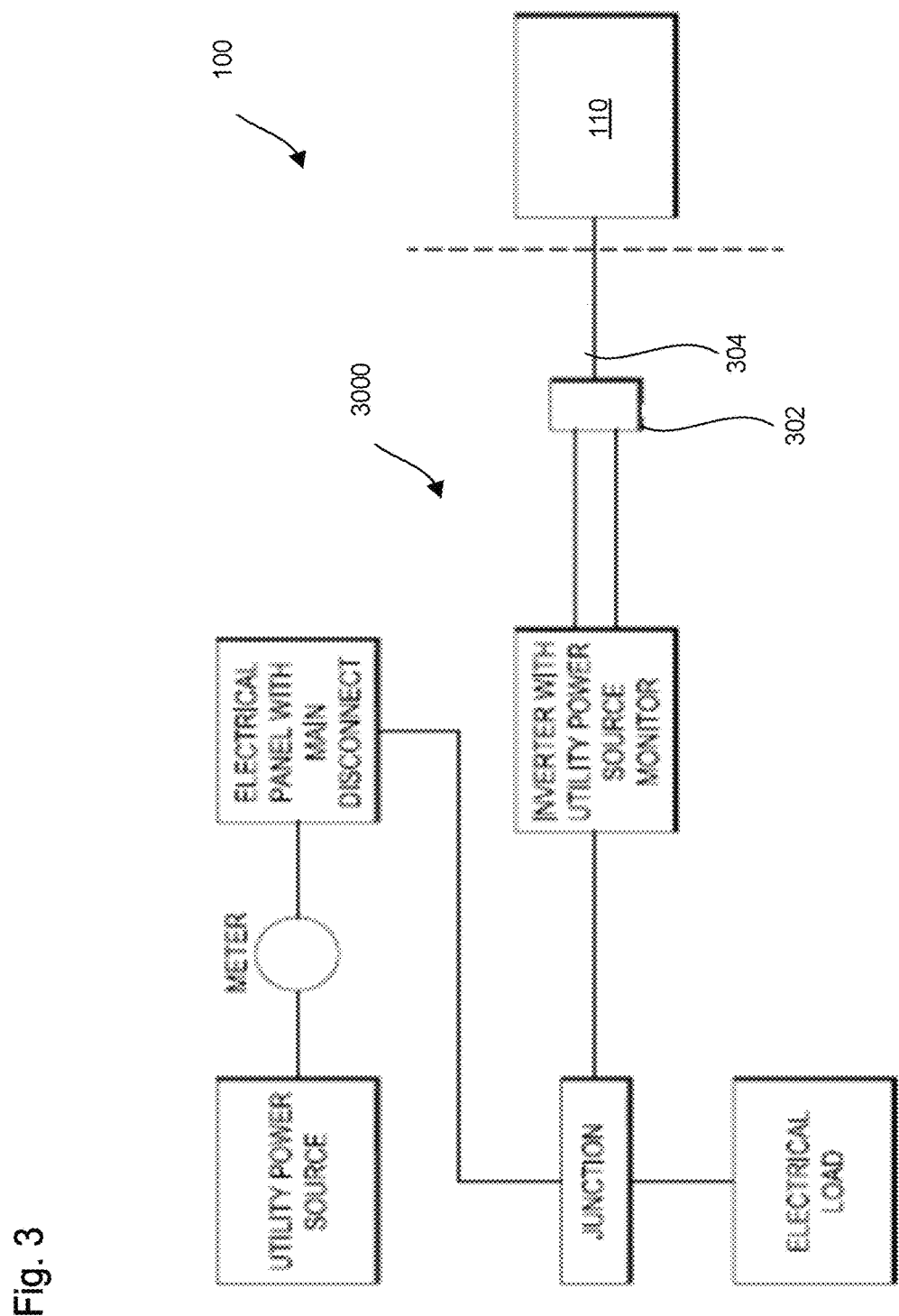
FIG. 3 is a schematic diagram of an optional electrical system connected to the array.

Solar Power System 100 FIGS. 1-3

FIG. 1 is a schematic perspective view of a solar power system 100 including an array 110 of solar modules 112 mounted to a mounting surface 102. FIG. 2 is a magnified perspective view of the solar power system 100 illustrated in FIG. 1. The solar power system 100 of FIGS. 1-2 is illustrated as being coupled to a mounting surface 102 that comprises a roof of a building, such as a residential, commercial, industrial structure, etc. There may be a superstructure under the mounting surface 102 providing support to the mounting surface 102, and which may be used to secure attachments to the mounting surface 102. For example, a plurality rafters may support a mounting surface 102 such as the roof of a building. Additionally, the mounting surface 102 may have an interlocking layer of shingles (e.g., tile shingles, composite shingles, wooden shingles) disposed on top. Additionally or alternatively, the mounting surface 102 may also include a corrugated metal (e.g., steel) roof.

The solar module 112 can include a photovoltaic (PV) laminate or panel having an assembly of crystalline or amorphous semiconductor devices ("PV cells") electrically interconnected and encapsulated within a weather-proof barrier that can include a frame 204. In some embodiments, solar modules can be frameless or comprise a partial frame. The solar modules 112 can be mounted on and coupled to the rails 202 that extend across the mounting surface 102. The rails 202 and frame 204 may comprise any of a number of suitable materials including aluminum, steel, or stainless steel. Either or both of the rails 202 and frame 204 may be anodized, painted, or otherwise coated with one or more layers to protect against corrosion, wear, etc. One or more flashings 206 may be disposed on top of the mounting surface 102 and the rails 202 may mechanically be coupled to the mounting surface 102 by way of a mounting assembly 200 partially disposed on top of the flashing 206. Each flashing 206 may comprise metal, polymer, or composite. It will be understood that each flashing 206 may be used to help waterproof the mounting surface 102 and prevent moisture (e.g., precipitation, ocean spray, etc.) from penetrating the mounting surface 102 through the mounting assembly 200. The type of flashing 206 may depend in part on the type of mounting surface 102. For example, the flashing 206 may be a first type of flashing for use with a composite tile roof if the mounting surface 102 includes composite tiles, but the flashing 206 may be a second type of flashing for use with corrugated metal roofs if the mounting surface 102 includes a corrugated metal roof. Alternatively, depending on the mounting surface, the mounting assembly may be installed directly on the mounting assembly without a flashing 206.

As shown in FIG. 2, a global x-y-z coordinate system can be defined across the mounting surface 102. For example, the rails 202 can extend along a length in the x-direction, and the array 110 can be positioned atop the rails 202 in the x-y plane. As used herein, the x-y-z coordinate system shown in FIG. 2 defines a global frame of reference for the solar modules 112 and other components disclosed herein. The solar modules 112 may be secured to the rails 202 by a plurality of center frame connectors 500 and end frame connectors 600 of the mounting assembly 200, see FIGS. 4A-4B, while the rails 202 may be secured to the mounting surface 102 by a roof mounting assembly 250 of the mounting assembly 200. It will be understood, however, that additionally or alternatively to a solar power system 100, the mounting assembly 200 disclosed herein may be used to secure any of a number of other fixtures to a mounting surface including but not limited to air conditioners, swamp coolers, solar water heaters, signs, lighting, antenna, etc.

FIG. 3 is a schematic diagram of an electrical system 3000 connected to the array 110. The solar power system 100 can be incorporated into the electrical system 3000 connected to the array 110. For example, the electrical system 3000 can include the array 110 as a power source connected to a remote connection device 302 with power lines 304. The electrical system 3000 can also include a utility power source, a meter, an electrical panel with a main disconnect, a junction, electrical loads, and/or an inverter with the utility power source monitor.

Figure 4B:
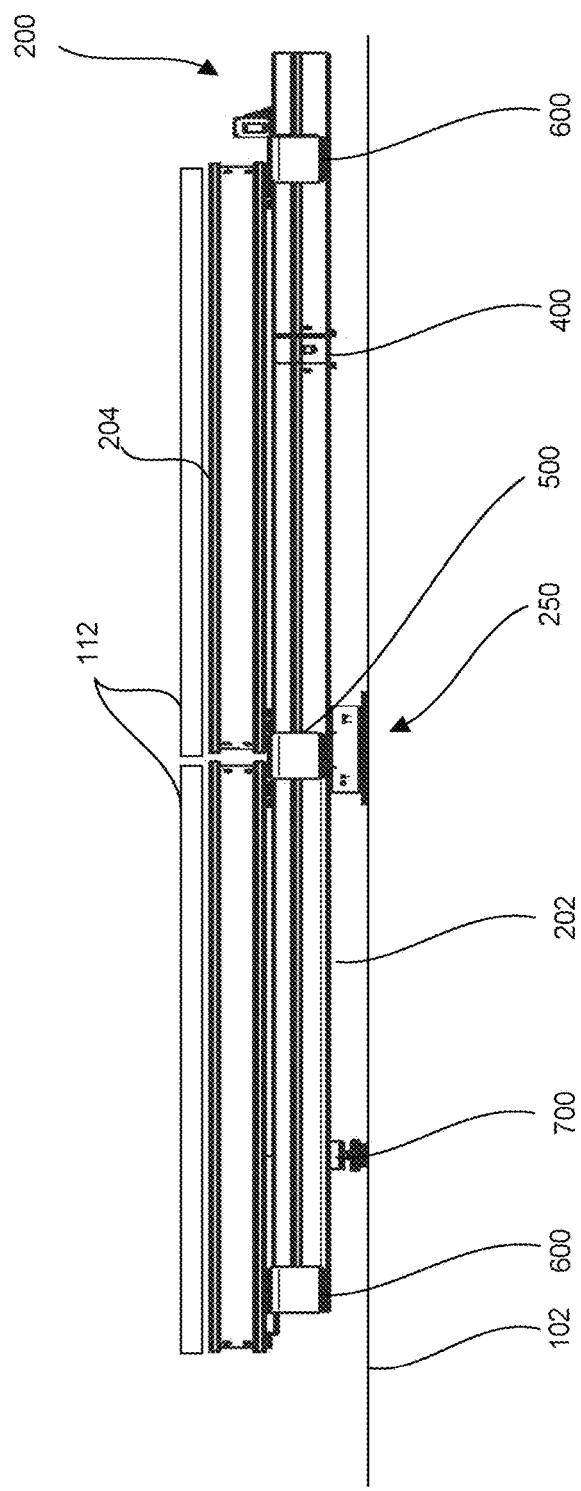
FIG. 4B is a side view of the mounting assembly of FIG. 4A.

Mounting Assembly 200 FIGS. 4A-4B

FIGS. 4A-4B are a perspective view and a side view of the mounting assembly 200 supporting the frames 204 of solar modules 112.

The mounting assembly 200 can include a plurality of roof mounting assemblies 250 that affixes the rails 202 onto the mounting surface 102 and places the rails 202 substantially parallel from each other, a plurality of rail connectors 400 that connects the rails 202 from end to end in the x-direction of the mounting surface 102, a plurality of rail supports 700 that provides support between the rails 202 and the mounting surface 102, a plurality of center frame connectors 500 and end frame connectors 600 that affixes the frames 204 of the solar modules 112 together and mounts the frames 204 onto the rails 202.

The mounting assembly 200, via the plurality of roof mounting assemblies 250, the plurality of rail connectors 400, the plurality of rail supports 700, and the plurality of center frame connectors 500 and end frame connectors 600, limits the use of tools to mount the solar modules 112 onto the mounting surface 102 and prevent excessive perforation of the mounting surface 102 while providing a sturdy fixation of the solar modules 112 onto the mounting surface 102.

Figure 5:
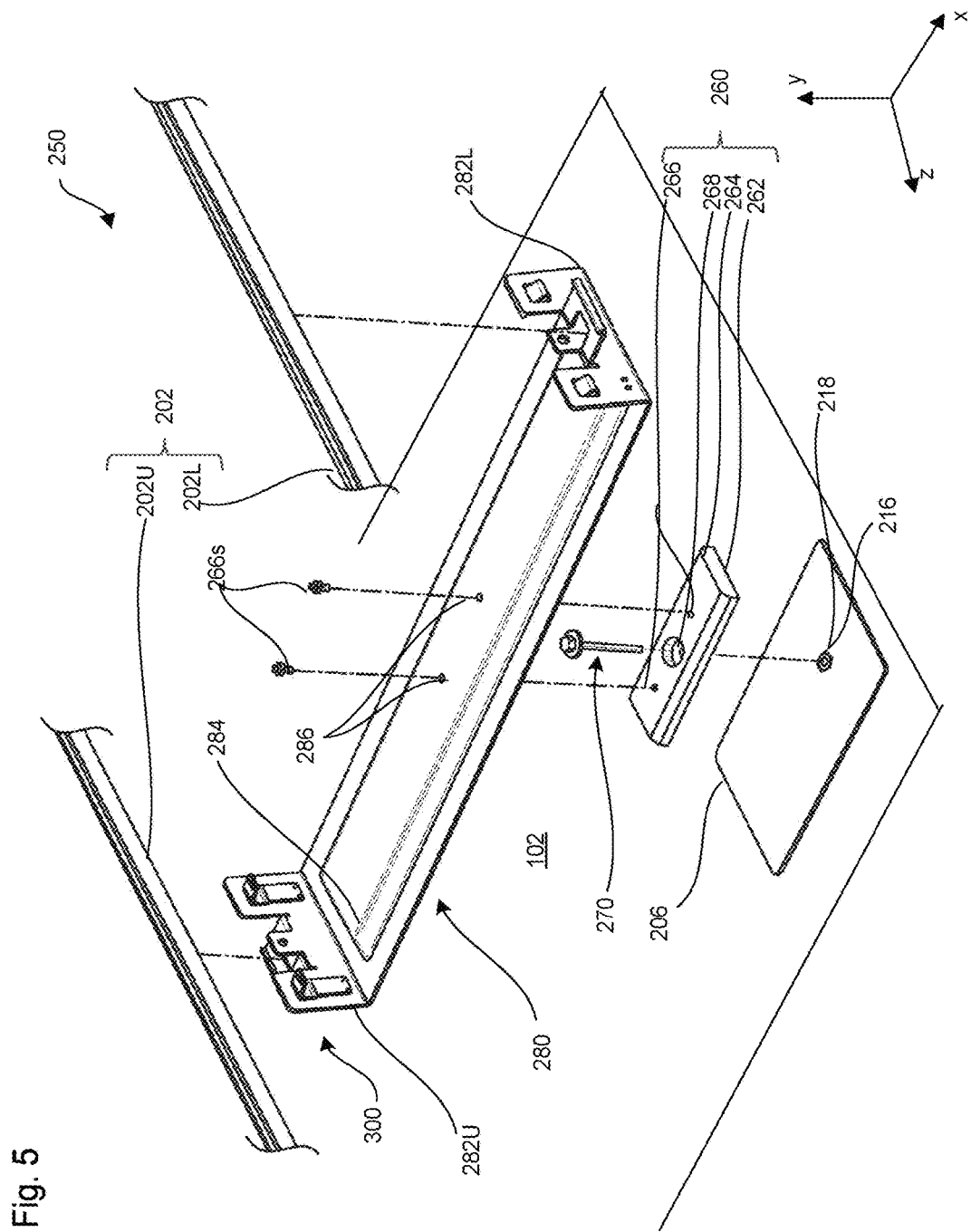
FIG. 5 is an exploded view of the roof mounting assembly.
Figure 6A:
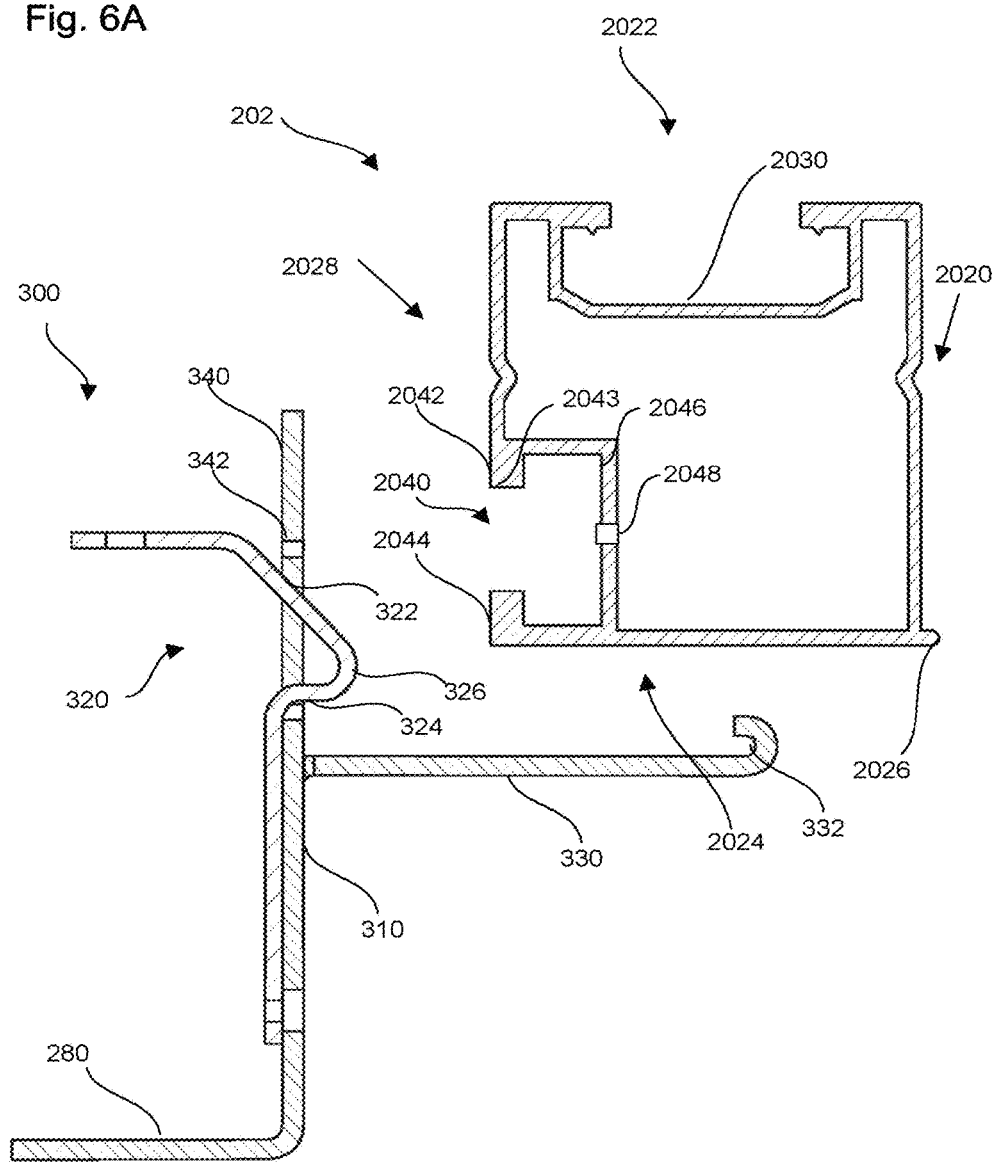
FIG. 6A is sectional view of a rail snap bracket and a rail in an unengaged state.
Figure 6B:
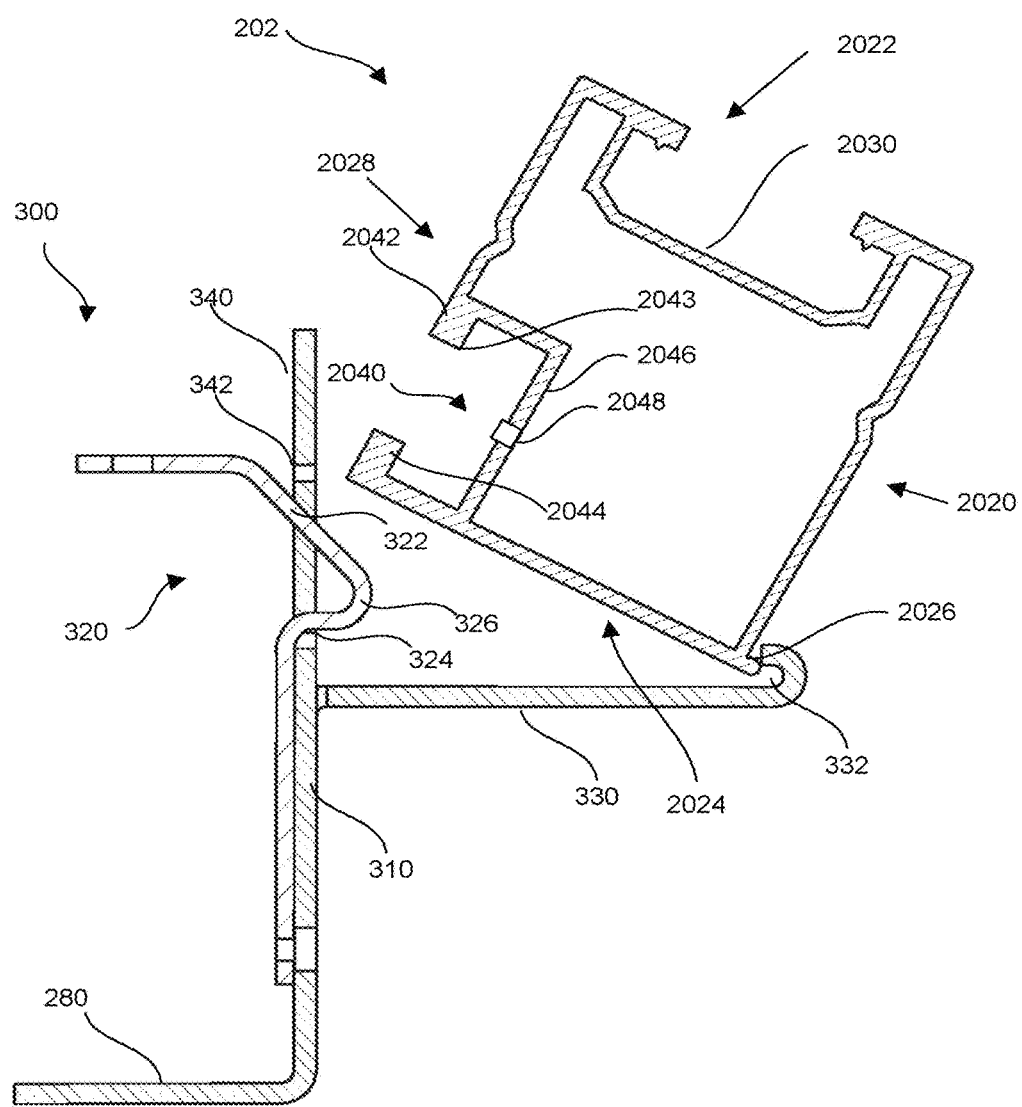
FIG. 6B is sectional view of the rail snap bracket and the rail in a partially engaged state.
Figure 6C:
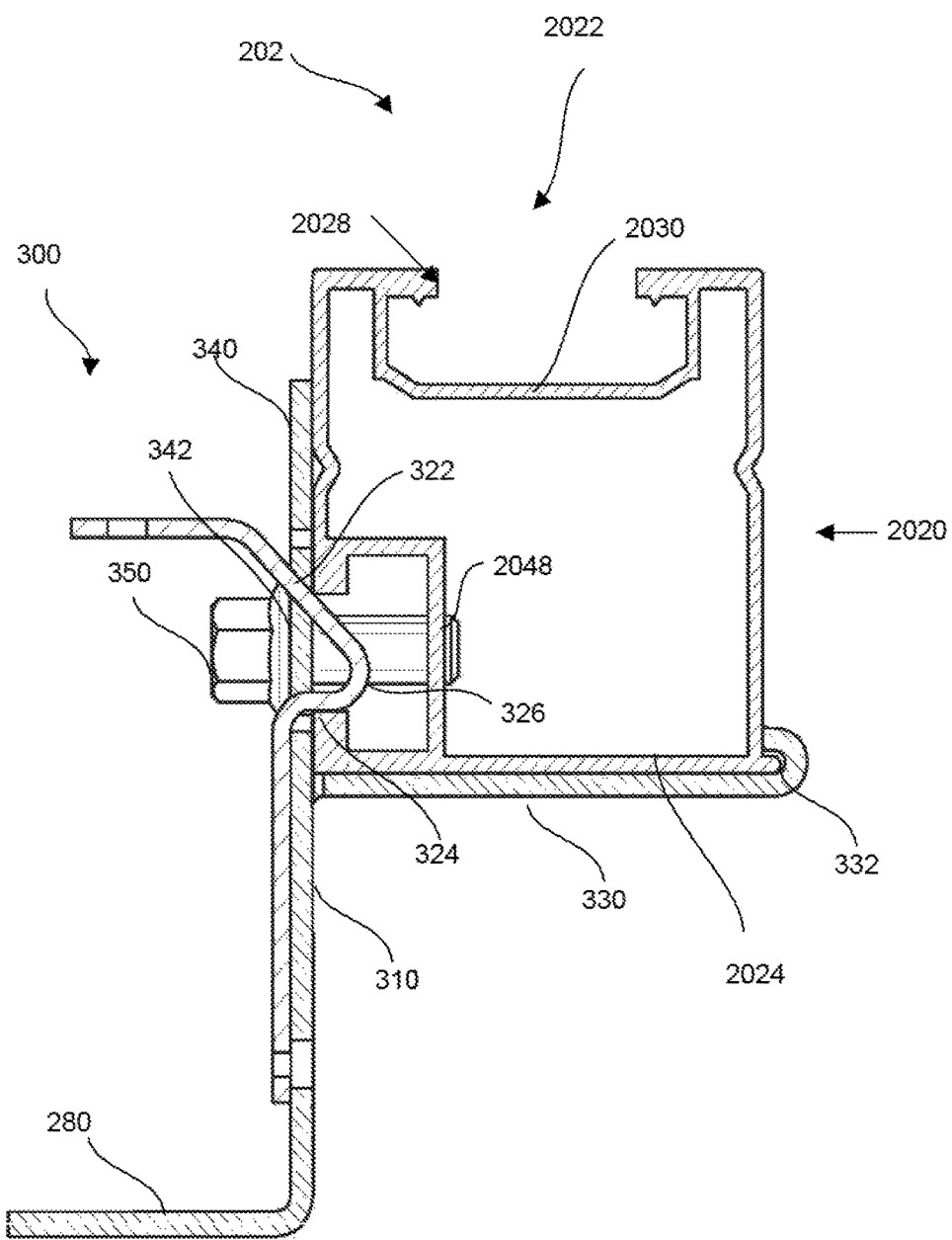
FIG. 6C is sectional view of the rail snap bracket and the rail in a fully engaged state.

Roof Mounting Assembly 250 FIGS. 5-6C

FIG. 5 is an exploded perspective view of each roof mounting assembly of the plurality of roof mounting assemblies 250.

Each roof mounting assembly of the plurality of roof mounting assemblies 250 can include the flashing 206, a mounting block 260 affixed to the flashing 206 via a lag bolt 270, a mounting plate 280 affixed to the mounting block 260 that extends over the flashing 206 and the mounting block 260 in the z-direction to support and place apart an upper rail 202U and a lower rail 202L of the rails 202 at an upper extremity 282U and a lower extremity 282L of the mounting plate 280. In some embodiments, a flashing and mounting block can be integrally formed.

The mounting block 260 can have a trapezoidal profile with a base surface 262 substantially flat to contact the flashing 206 and a top surface 264 substantially flat and narrower than the mounting plate 280. The mounting block 260 can include a pair of threaded holes 266 placed on the top surface 264 and aligned with the x-direction, and a counter bore hole 268 that goes through the top surface 264 and the base surface 262 of the mounting block 260. The pair of threaded holes 266 can receive a pair of fasteners 266s to affix the mounting plate 280 to the mounting block 260 while the counter bore hole 268 can receive the lag bolt 270 to affix the mounting plate 280 to the flashing 206 and to the mounting surface 102.

The flashing 206 can include a pre-drilled hole 216 to facilitate the insertion of the lag bolt 270 through the flashing 206. In addition, the pre-drilled hole 216 can include a seal 218 that is placed around a body of the lag bolt 270 to prevent leaks through the mounting surface 102 from happening.

The mounting plate 280 can include an embossment 284 between the upper extremity 282U and the lower extremity 282L to match the trapezoidal profile of the mounting block 260, and a pair of slots 286 that can be aligned with the pair of threaded holes 266 of the mounting block 260 to receive the pair of fasteners 266s and affix the mounting plate 280 to the mounting block 260. In addition, the pair of slots 286 can provide a predetermined play in the y-direction to facilitate positioning of the mounting plate 280.

FIGS. 6A-6C are sectional views of a rail snap bracket 300 and the rail 202 in an unengaged state, a partially engaged state, and a fully engaged state, respectively.

The mounting plate 280 can include a rail snap bracket 300 located at the upper extremity 282U and the lower extremity 282L of the mounting plate 280 to receive the rail 202 and lock the rail 202 in place by articulating the rail 202 from an unengaged state to a partially engaged state, see FIGS. 6A-6B, and from the partially engaged state to a fully engaged state, see FIGS. 6B-6C.

The rail 202 can include an external side 2020, a top side 2022 adjacent to the external side 2020 with a top recess 2030 that runs along a longitudinal length of the rail 202, a bottom side 2024 opposite to the top side 2022 with a lip 2026 that protrudes from a corner defined by the top side 2022 and the external side 2020, and an internal side 2028 opposite to the external side 2020 with an internal recess 2040 that runs along a longitudinal length of the rail 202 and adjacent to the bottom side 2024.

The internal recess 2040 can include a top stop 2042, a bottom stop 2044 facing the top stop 2042 that delimits a recess opening 2043, and a recess wall 2046 opposite to the top and bottom stops 2042, 2044 with a recess threaded hole 2048 that faces the recess opening 2043.

The rail snap bracket 300 can include a first support wall 310 that protrudes upwardly from the mounting plate 280, a pair of notches 320 that protrudes outwardly from the first support wall 310, a second support wall 330 that protrudes outwardly from the first support wall 310 between the pair of notches 320, a hook 332 placed along an outward extremity of the second support wall 330, and a tongue or ridge 340 with a tongue hole 342 that protrudes upwardly from the second support wall 330 between the pair of notches 320.

The pair of notches 320 can include a slanted portion 322 with respect to the first support wall 310 that faces upward, a planar portion 324 that faces downward, and a rounded portion 326 that connects the slanted portion 322 and the planar portion 324. The pair of notches 320 can be cut away and/or embossed from the first support wall 310 to provide flexibility and the ability to be deflected inwardly when a bias force is applied on the slanted portion 322, e.g. when the rail 202 in inserted into the rail snap bracket 300 and articulated from the partially engaged state to a fully engaged state.

The rail snap bracket 300 is elaborated to lock and affix the rail 202 to the mounting plate 280 without the use of tools. An operator can affixed the rail 202 onto the mounting plate 280 without the use of tools, by manually articulating the rail 202 into the rail snap bracket 300 from the unengaged state to the partially engaged state, and from the partially engaged state to the fully engaged state.

To articulate the rail 202 from the unengaged state to the partially engaged state, the lip 2026 of the rail 202 is inserted into the hook 332 of the second support wall 330 and a portion of the bottom side 2024 of the rail 202 is left resting on the pair of notches 320.

To articulate the rail 202 from the partially engaged state to the fully engaged state, the operator rotates the rail 202 towards the second support wall 330 to force the pair of notches 320 into the internal recess 2040 and lock the internal side 2028 of the rail 202 against the first support wall 310 of the rail snap bracket 300 and the bottom side 2024 of the rail 202 against the second support wall 330 of the rail snap bracket 300. Through the rotation of the rail 202, the bottom stop 2044 of the internal side 2028 contacts the slanted portion 322 of the pair of notches 320 and deflects the pair of notches 320 inwardly. Through the inward deflection of the pair of notches 320, the bottom stop 2044 of the internal side 2028 passes over the rounded portion 326 of the pair of notches 320 and the rounded portion 326 is inserted in the recess opening 2043 of the internal recess 2040. The top stop 2042 of the internal recess 2040 rests on the slanted portion 322 of the pair of notches 320 and the planar portion 324 of the pair of notches 320 rests on the bottom stop 2044 of the internal recess 2040. The lip 2026 of the bottom side 2024 rotates inside the hook 332 of the second support wall 330.

To further lock the rail 202 in the fully engaged state, a bracket fastener 350, e.g. a bolt, a screw, or the like, can be inserted through the tongue hole 342 of the tongue 340 and through the recess opening 2043 of the internal recess 2040 and threaded into the recess threaded hole 2048 of the recess wall 2046 to affix the internal side 2028 of the rail 202 against the first support wall 310 of the rail snap bracket 300.

Figure 7:
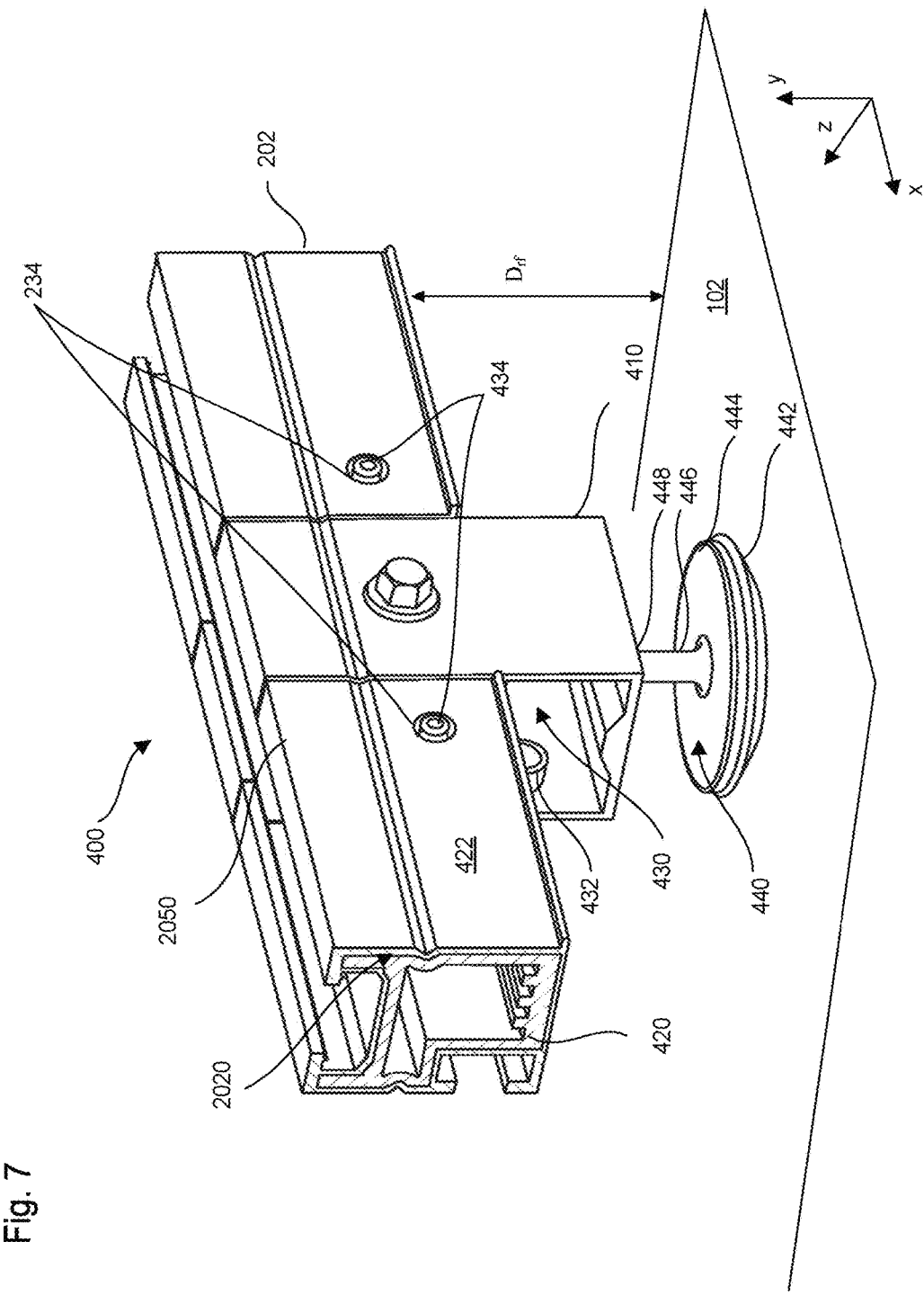
FIG. 7 is a cutaway view of a rail connector with two rails connected end-to-end.

Rail Connector 400 FIG. 7

FIG. 7 is a cutaway view of a rail connector of the plurality of rail connectors 400 that connects the rails 202 end-to-end.

The plurality of rail connectors 400 of the mounting assembly 200 connect the rails 202 from end to end and extend the rails 202 in the x-direction of the mounting surface 102, see FIG. 2.

Each rail connector of the plurality of rail connectors 400 can include a support bracket 410, an inner rail 420 enclosed by the support bracket 410 and that protrudes in the x-direction from the support bracket 410, and a locking mechanism 430 that locks the rails 202 onto the inner rails 420. The locking mechanism 430 can include a pair of triggers 432 located below the inner rail 420, and a pair of pins or protrusions 434 actuated by the pair of triggers 432 to retract and/or protrude from a side wall 422 of the inner rail 420.

To connect the rails 202 from end to end, the operator can insert terminal ends 2050 of the rails 202 along the inner rail 420 and lock the rails 202 onto the inner rail 420. To insert the rails 202 into the inner rails 420, the operator can actuate the pair of triggers 432, e.g. pull, to retract the pair of pins 434 from the side wall 422 of the inner rail 420 and enable the rails 202 to slide along a length of the inner rail 420 up to the support bracket 410. To lock the rails 202 into the inner rails 420, the operator can actuate the pair of triggers 432, e.g. release, to extend the pair of pins 434 from the inner rail 420 and to insert the pair of pins 434 into pin holes 234 located on the external side 2020 of the rails 202 and substantially close to the terminal end 2050 of the rails 202.

In addition, the rail connector 400 can include an adjustable foot 440 inserted in a lower portion of the support bracket 410 to adjust a rail roof distance $D_{rf}$ between the mounting surface 102 and the rails 202.

The adjustable foot 440, can include a foot pad 442 that seats on the mounting surface 102, a foot base 444 that supports the foot pad 442, a foot threaded rod 446 affixed by one extremity to the foot base 444, and a foot threaded hole 448 on a lower portion of the support bracket 410 that receives the foot threaded rod 446.

Through the adjustable foot 440, the operator can adjust the rail roof distance $D_{rf}$ between the mounting surface 102 and the rails 202 by threading and unthreading the foot threaded rod 446 into the foot threaded hole 448.

Figure 8:
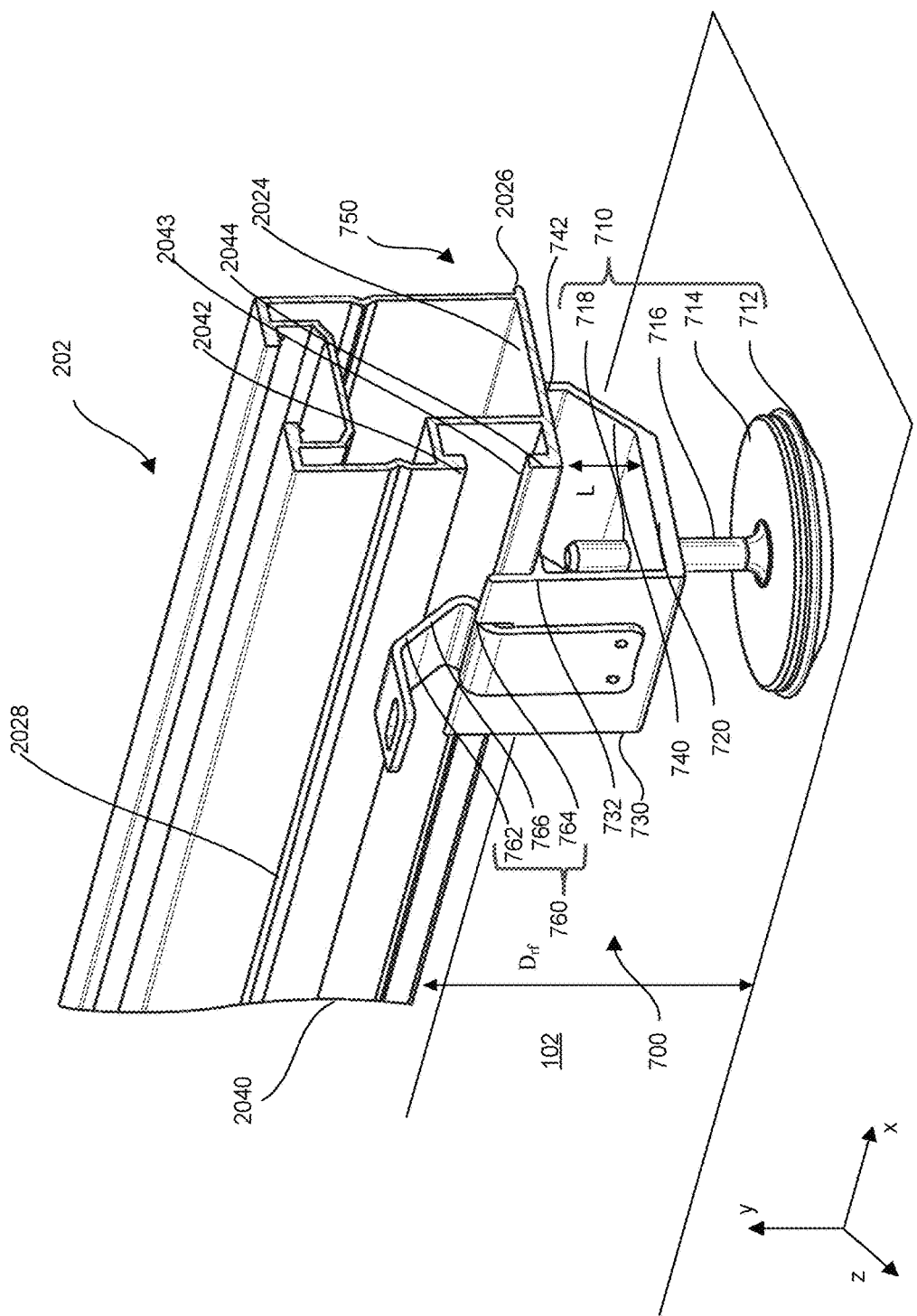
FIG. 8 is a perspective view of a rail support engaged in the rail.

Rail Support 700 FIG. 8

FIG. 8 is a perspective view of a rail support 700 engaged in the rail 202.

The plurality of rail supports 700 provides support between the rails 202 and the mounting surface 102.

Each rail support of the plurality rail supports 700 can include an adjustable foot 710, a base 720 that surmounts the adjustable foot 710, a first wall 730 that protrudes upwardly from the base 720, a first edge 732 that protrudes inwardly from the first wall 730, a second support wall 740 that protrudes obliquely from the base 720, a second edge 742 that protrudes inwardly from the second support wall 740, a hook 750 placed along an outward extremity of the second support wall 740, and a notch 760 that protrudes upwardly from the first wall 730.

Similarly to the notches 320 of the rail snap bracket 300, the notch 760 of the rail support 700 can include a slanted portion 762 that faces upward, a planar portion 764 that faces downward, and a rounded portion 766 that connects the slanted portion 762 and the planar portion 764. The notch 760 can be flexible and have the ability to be deflected outwardly when a bias force is applied on the slanted portion 762.

Similarly to the rail snap bracket 300, the rail support 700 can engage the rail 202 and lock the rail 202 in place without the use of tool.

To engage and lock the rail 202 in the rail support 700, the operator can insert the lip 2026 of the rail 202 in the hook 750 of the rail support 700 and rotate the rail 202 towards the base 720 of the rail support 700 to force the notch 760 into the internal recess 2040 of the rail 202 and lock the internal side 2028 of the rail 202 against the first wall 730 of the rail support 700 and the bottom side 2024 of the rail 202 against the second edge 742 of the rail support 700. Through the rotation of the rail 202, the bottom stop 2044 of the internal side 2028 contacts the slanted portion 762 of the notch 760 and deflects the notch 760 outwardly. Through the outward deflection the notch 760, the bottom stop 2044 of the internal side 2028 passes over the rounded section 766 of the notch 760 and the rounded portion 766 is inserted in the recess opening 2043 of the internal recess 2040 with the top stop 2042 of the internal recess 2040 resting on the slanted portion 762 of the notch 760 and the planar portion 764 of the notch 760 resting on the bottom stop 2044 of the internal recess 2040. The lip 2026 of the bottom side 2024 rotates inside the hook 750 of the second edge 742.

Similarly to the adjustable foot 440 of the rail connector 400, the adjustable foot 710 of the rail support 700 can include a foot pad 712 that seats on the mounting surface 102, a foot base 714 that supports the foot pad 712, a foot threaded body 716 affixed by one extremity to the foot base 714, and a foot threaded hole 718 on the foot base 714 of the rail support 700 that receives the foot threaded body 716.

Through the adjustable foot 710, the operator can adjust the rail roof distance $D_{rf}$ between the mounting surface 102 and the rails 202 by threading and unthreading the foot threaded body 716 into the foot threaded hole 718.

The first wall 730 and the second support wall 740 can protrude from the base 720 to leave a predetermined distance L between the base 720 and the bottom side 2024 of the rail 202 and to allow the foot threaded body 716 to be completely threaded into the foot threaded hole 718, e.g. the foot base 714 of the adjustable foot 710 is in contact with the base 720 of the rail support 700.

Figure 9C:
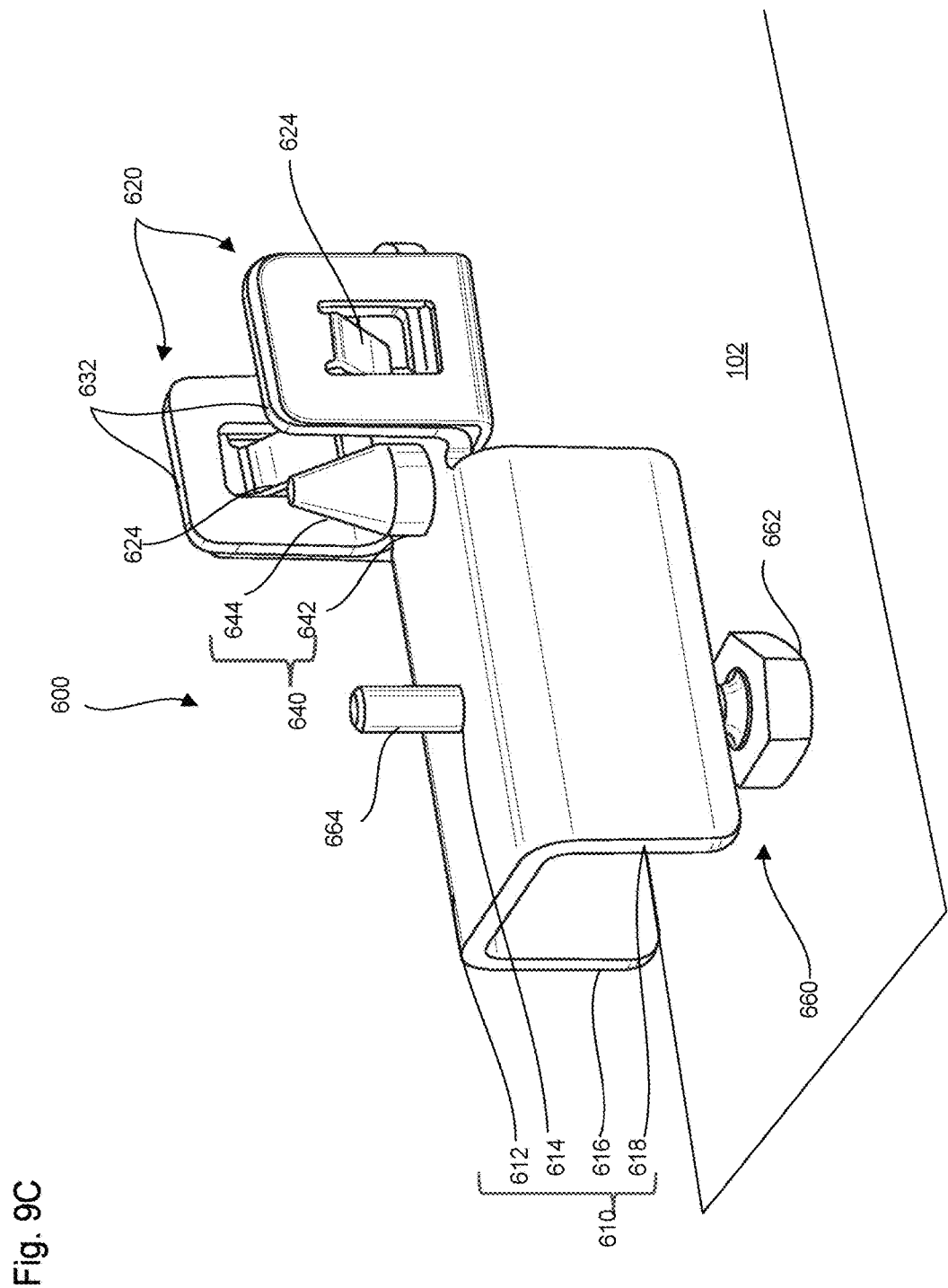
FIG. 9C is a perspective view of an end frame connector alone.

Center Frame Connector 500 FIGS. 9A-9C

FIGS. 9A-9B are a perspective view of a center frame connector 500 alone and the center frame connector 500 mounted onto the rail 202 and supporting the frame 204 of the solar modules 112, respectively.

The plurality of center frame connectors 500 and end frame connectors 600 can affix the frames 204 of the solar modules 112 together and mount the frames 204 onto the rails 202.

Each center frame connector of the plurality of center frame connectors 500 can include a guide rail 510, a first pair of notches 520 placed at or near a first extremity of the guide rail 510 and facing each other, a second pair of notches 530 placed at or near a second extremity of the guide rail 510 and facing each other, a first pin 540 placed between the first pair of notches 520, a second pin 550 placed between the second pair of notches 530, and a fastener 560 placed between the first pin 540 and the second pin 550.

The guide rail 510 can slide along the rail 202 up to a desired location, e.g. where a first frame 204a and a second frame 204b of the frames 204 need to be affixed together, and be affixed to the rail 202 at the desired location through the fastener 560. The first and second pins 540, 550 can guide the first and the second frames 204a, 204b through the center frame connector 500, and the first and second pairs of notches 520, 530 can affix the first and second frames 204a, 204b onto the center frame connector 500.

The guide rail 510 can include a guide rail base 512, a threaded hole 514 placed on a central portion of the guide rail base 512, an internal guide rail wall 516 that protrudes downwardly from the guide rail base 512, and an external guide rail wall 518 that protrudes downwardly from the guide rail base 512 substantially parallel to the internal guide rail wall 516.

The first pair of notches 520 can include a first pair of supporting walls 522 that protrudes upwardly from the guide rail base 512 of the guide rail 510 and a first pair of slanted portions 524 that is cut out from the supporting walls 522. Similarly to the first pair of notches 520, the second pair of notches 530 can include a second pair of supporting walls 532 that protrudes upwardly from the guide rail base 512 of the guide rail 510 and a second pair of slanted portions 534 that is cut out from the supporting walls 532.

The first pin 540 can include a first cylindrical base 542 affixed to the guide rail base 512 of the guide rail 510, and a first conical summit 544 placed on top of the first cylindrical base 542. Similarly to the first pin 540, the second pin 550 (not shown) can include a second cylindrical base 552 (not shown) affixed to the guide rail base 512 of the guide rail 510, and a second conical summit 554 (not shown) placed on top of the second cylindrical base 552.

The first frame 204*a* can include a first tongue 20410 that protrudes inwardly from a side member of the first frame 204*a*, and a first tongue hole 20412 placed on terminal end of the first tongue 20410. Similarly, the second frame 204*b* can include a second tongue 20420 that protrudes inwardly from a side member of the second frame 204*b*, and a second tongue hole 20420 placed on terminal end of the first tongue 20410.

The guide rail base 512 contacts the top side 2022 of the rail 202 and the internal and external guide rail walls 516, 518 protrudes along the internal and external sides 2028, 2020 of the rail 202 to act as a guide and prevent the center frame connector 500 from derailing. A head 562 of the fastener 560 is inserted within the top recess 2030 of the rail 202 and a threaded body 564 of the fastener 560 is threaded in the threaded hole 514 of the guide rail base 512.

To slide the center frame connector 500 along the rail 202, the operator can unthread the fastener 560 to make sure that the head 562 of the fastener 560 does not contact the top side 2022 of the rail 202. To affix the center frame connector 500 onto the rail 202 the operator can thread the fastener 560 to have the head 562 of the fastener 560 pressing against the top side 2022 of the rail 202.

To affix the first frame 204*a* to the first pair of notches 520, the operator can press the first tongue 20410 of the first frame 204*a* into the first pair of notches 520 and the second tongue 20420 of the second frame 204*b* into the second pairs of notches 230.

The first tongue 20410 contacts the pair of slanted portions 534 of the first pair of notches 520 and deflects the first pair of notches 520 outwardly to let the first tongue 20410 pass through the first pair of notches 520 and contact the guide rail base 512. Once the first tongue 20410 contacts the guide rail base 512 the first pair of slanted portions 534 deflects back inwardly and maintains the first tongue 20410 affixed against the guide rail base 512. The first hole 20412 of the first tongue 20410 is inserted from the first conical summit 544 up to the first cylindrical base 542 of the first pin 540 to guide the first tongue 20410 through the first pair of notches 520.

Similarly, the second tongue 20410 contacts the second pair of slanted portions 534 of the second pair of notches 530 and deflects the second pair of notches 530 outwardly to let the second tongue 20420 pass through the second pair of notches 530 and contact the guide rail base 512. Once the second tongue 20420 contacts the guide rail base 512 the second pair of slanted portions 534 deflects back outwardly and maintains the second tongue 20420 affixed against the guide rail base 512. The second hole 20422 of the second tongue 20420 is inserted from the second conical summit 554 up to the second cylindrical base 552 to guide the second tongue 20420 through the second pair of notches 530.

As depicted in FIG. 9B, the center frame connector 500 spans the adjacent frames 204 of the solar modules 112 and can be supported by the rail 202. In some embodiments, the center frame connector 500 can further include additional support elements. For example, the center frame connector 500 can be positioned so as to span the adjacent frames 204 of solar modules 112, and be supported by an adjustable foot contacting mounting surface 102.

End Frame Connector 600 FIGS. 9C-9D

FIGS. 9C-9D are a perspective view of an end frame connector 600 alone and the end frame connector 600 mounted onto the rail 202 and supporting the frame 204 of the solar modules 112, respectively.

Each end frame connector of the plurality of end frame connectors 600 can include a guide rail 610, a pair of notches 620 placed at an extremity of the guide rail 610, a pin 640 placed between the pair of notches 620, and a fastener 660 placed on a central portion of the guide rail 610.

The end frame connector 600 can include similar elements as the center frame connector 500 but without the elements corresponding to the second pair of notches 530. The end frame connector 600 is elaborated to affix a terminal frame 204*c* to the rail 202 and consequently only one single pair of notches 620 is necessary.

The guide rail 610 can slide along the rail 202 up to a desired location, e.g. where a terminal frame 204*c* of the frames 204 need to be placed, and be affixed to the rail 202 at the desired location through the fastener 660. The pin 640 can guide the terminal frame 204*c* through the end frame connector 600, and the pair of notches 520 can affix the terminal frame 204*c* onto the end frame connector 600.

The guide rail 610 can include a guide rail base 612, a threaded hole 614 placed on a central portion of the guide rail base 612, an internal guide rail wall 616 that protrudes downwardly from the guide rail base 612, and an external guide rail wall 618 that protrudes downwardly from the guide rail base 612 substantially parallel to the internal guide rail wall 616.

The pair of notches 620 can include a pair of supporting walls 632 that protrudes upwardly from the guide rail base 612 of the guide rail 610 and a pair of slanted portions 624 that is cut out from the supporting walls 632.

The pin 640 can include a cylindrical base 642 affixed to the guide rail base 612 of the guide rail 610, and a conical summit 644 placed on top of the cylindrical base 642.

The terminal frame 204*c* can include a terminal tongue 20430 that protrudes inwardly from a side member of the terminal frame 204*c*, and a terminal tongue hole 20432 placed on terminal end of the terminal tongue 20430.

The guide rail base 612 contacts the top side 2022 of the rail 202 and the internal and external guide rail walls 616, 618 protrudes along the internal and external sides 2028, 2020 of the rail 202 to act as a guide and prevent the end frame connector 600 from derailing. A head 662 of the fastener 660 is inserted within the top recess 2030 of the rail 202 and a threaded body 664 of the fastener 660 is threaded in the threaded hole 614 of the guide rail base 612.

To slide the end frame connector 600 along the rail 202, the operator can unthread the fastener 660 to make sure that the head 662 of the fastener 660 does not contact the top side 2022 of the rail 202, while to affix the end frame connector 600 onto the rail 202 the operator can thread the fastener 660 to have the head 662 of the fastener 660 that presses against the top side 2022 of the rail 202.

To affix the terminal frame 204c to the pair of notches 620, the operator can press the terminal tongue 20430 of the terminal frame 204c into the pair of notches 620. The terminal tongue 20430 contacts the pair of slanted portions 622 of the pair of notches 620 and deflects the pair of notches 620 outwardly to let the terminal tongue 20430 pass through the pair of notches 620 and contact the guide rail base 612. Once the terminal tongue 20430 contacts the guide rail base 612 the pair of slanted portions 622 deflects back inwardly and maintains the terminal tongue 20430 affixed against the guide rail base 612. The terminal hole 20432 of the terminal tongue 20430 is inserted from the conical summit 644 up to the cylindrical base 642 of the pin 640 to guide the terminal tongue 20430 through the pair of notches 620.

Figure 10A:
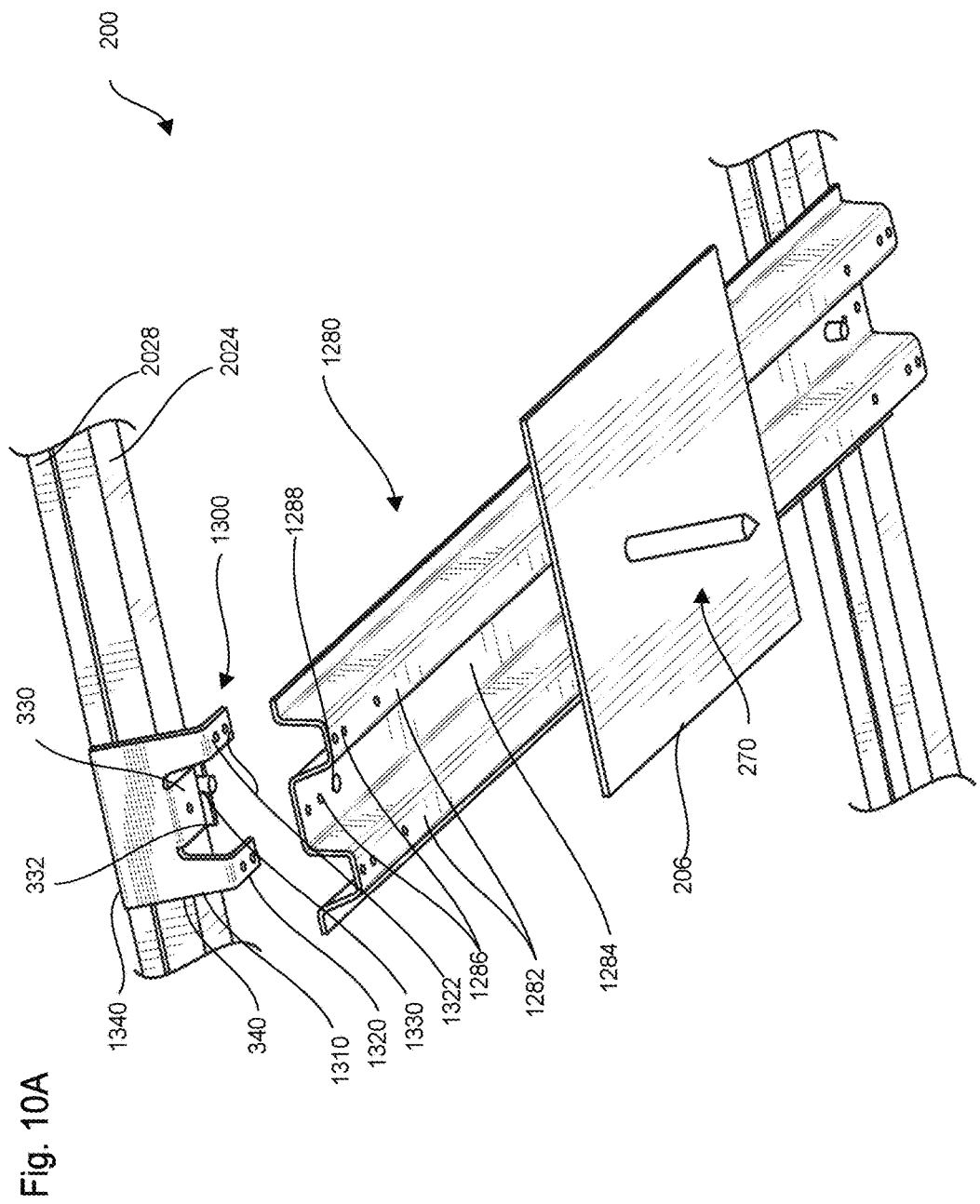
FIG. 10A is exploded perspective view of the mounting assembly with floating rail snap brackets and a floating mounting plate.
Figure 10B:
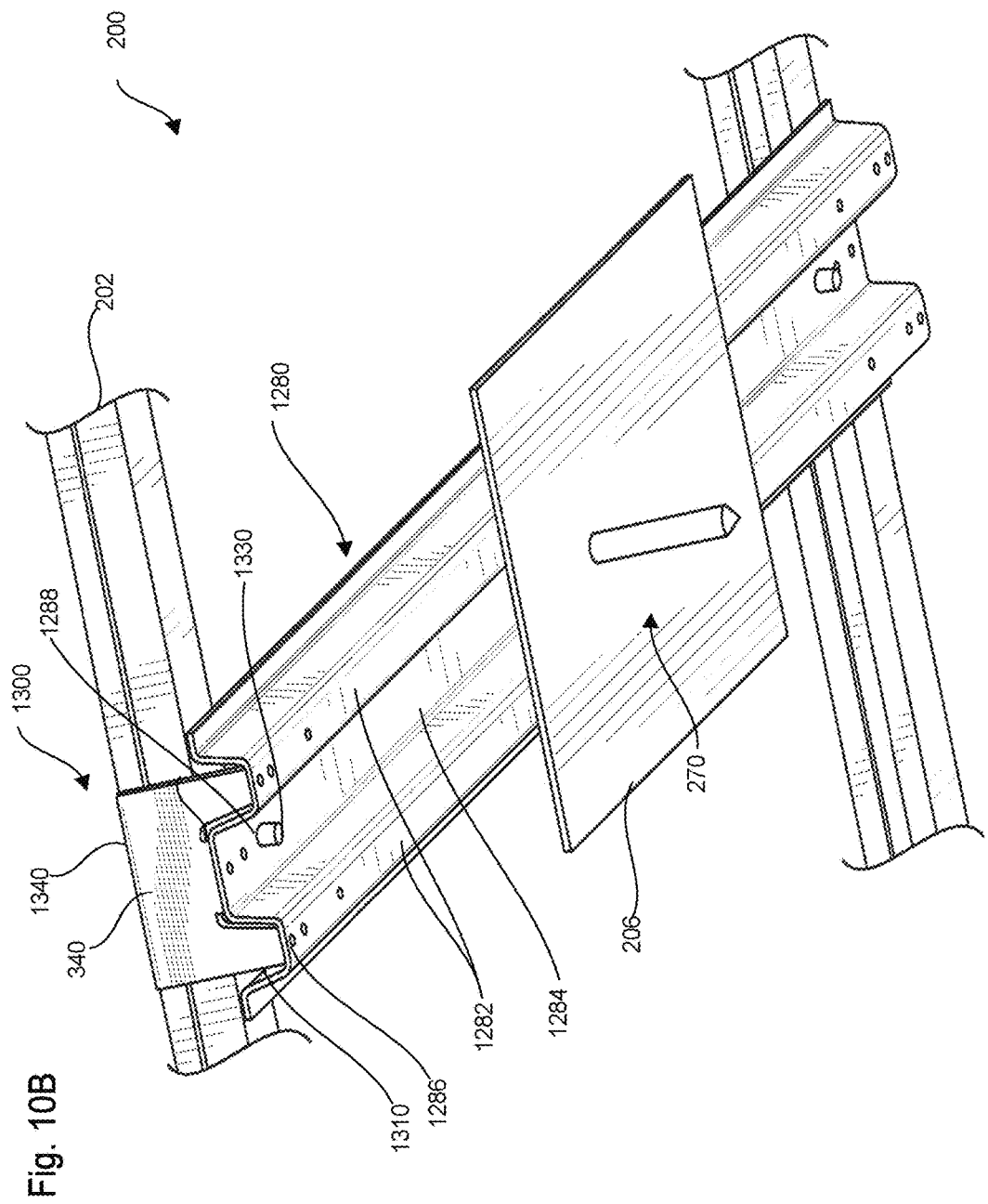
FIG. 10B is assembled perspective view of the mounting assembly with the floating rail snap brackets and the floating mounting plate.

Floating Rail Snap Bracket 1300 FIGS. 10A-10B

FIGS. 10A-10B are exploded and assembled perspective views of the mounting assembly 200 with floating rail snap brackets 1300 and a floating mounting plate 1280.

In an alternative non-limiting illustrative example, the mounting plate 280 and the rail snap brackets 300 can be replaced by a floating mounting plate 1280 and floating rail snap brackets 1300 that is fixable to extremities of the floating mounting plate 1280.

The floating rail snap bracket 1300 can have similar shapes, functionalities, and elements as the rail snap bracket 300, e.g. the second support wall 330, the hook 332, and the tongue 340. However, the floating rail snap bracket 1300 can include a tongue hook 1340 positioned on top of the tongue 340, a pair of legs 1310 that protrudes downwardly from the second support wall 330, a pair of feet 1320 that ends the pair of legs 1310, and a pin 1330 that protrudes downwardly from the second support wall 330.

In addition, the second support wall 330 and the pair of feet 1320 can include a plurality of affixing holes 1322.

The floating mounting plate 1280 can include a pair of lower support surfaces 1282 that is substantially flat and run along a full length of the floating mounting plate 1280, and an upper support surface 1284 positioned between the pair of lower support surfaces 1282 that is substantially flat and run along the full length of the floating mounting plate 1280.

The upper support surface 1284 and the pair of lower support surfaces 1282 are characterized by a plurality of affixing holes 1286 placed in the vicinity of the extremities of the floating mounting plate 1280. In addition, the upper support surface 1284 can include a pin through hole 1288 placed at a predetermined distance from the extremities of the floating mounting plate 1280.

To affix the rail 202 to the mounting surface 102, the operator can affix the rail 202 onto the floating rail snap bracket 1300 and then affix the floating snap rail bracket 1300 onto the floating mounting plate 1280.

To affix the rail 202 onto the floating rail snap bracket 1300, the operator can insert the lip 2026 of the rail 202 into the hook 332 of the second support wall 330 and push the internal side 2028 of the rail 202 against the tongue 340 to engage the tongue hook 1340 into the top recess 2030 of the rail 202.

To affix the floating rail snap bracket 1300 onto the floating mounting plate 1280, the operator can place the second support wall 330 onto the upper support surface 1284, insert the pin 1330 into the pin through hole 1288, and place the pair of feet 1320 onto the pair of lower support surfaces 1282.

In addition, to securely affix the floating rail snap bracket 1300 onto the floating mounting plate 1280, the operator can aligned the plurality of affixing holes 1322 of the floating rail snap bracket 1300 with the plurality of affixing holes 1286 of the floating mounting plate 1280 and insert fastening devices, e.g. bolts and nuts, rivets, welding points, and/or glue points, through the plurality of affixing holes 1322, 1286.

Figure 11A:
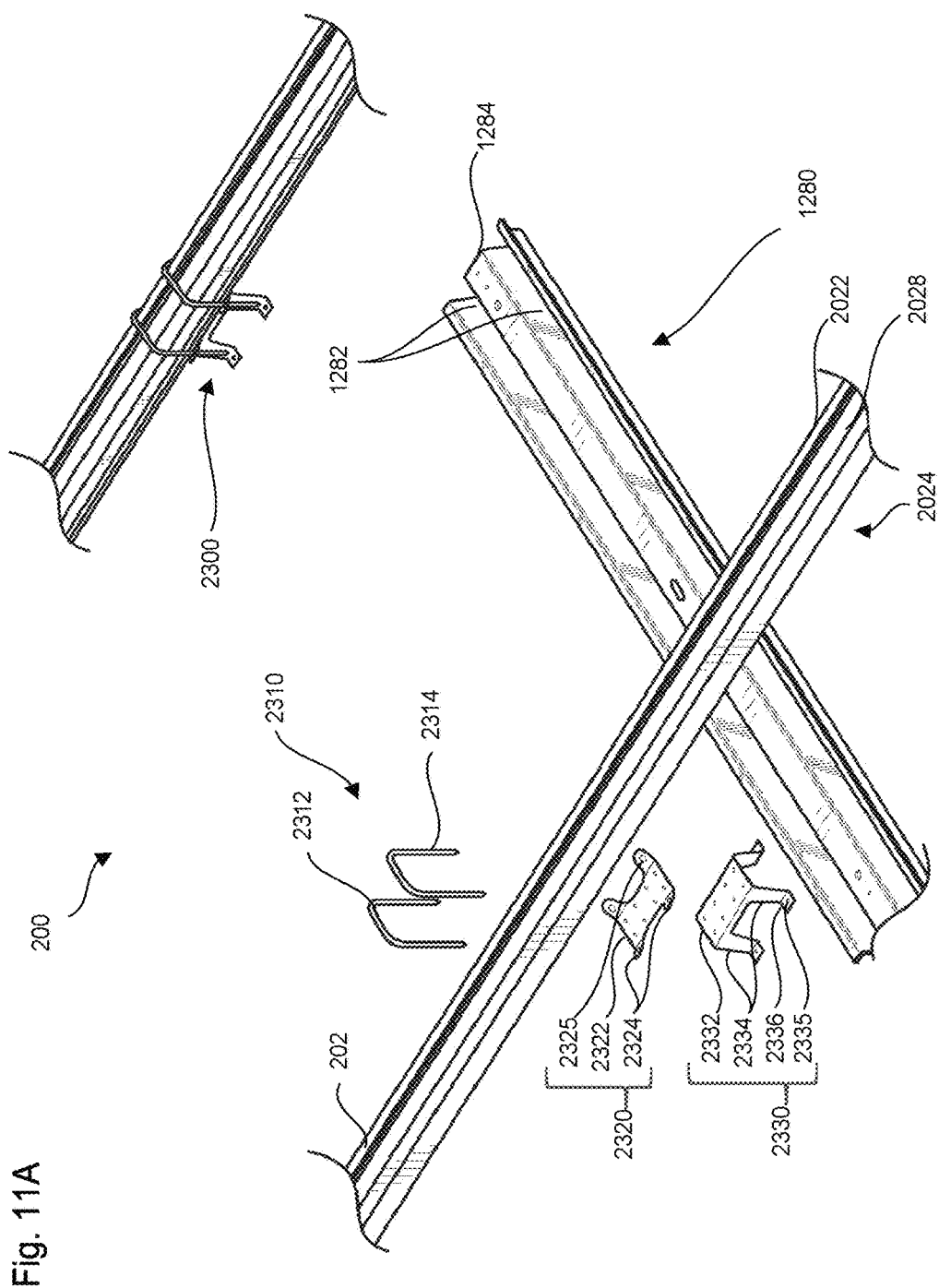
FIG. 11A is an exploded perspective view of the mounting assembly with a staple assembly.
Figure 11B:
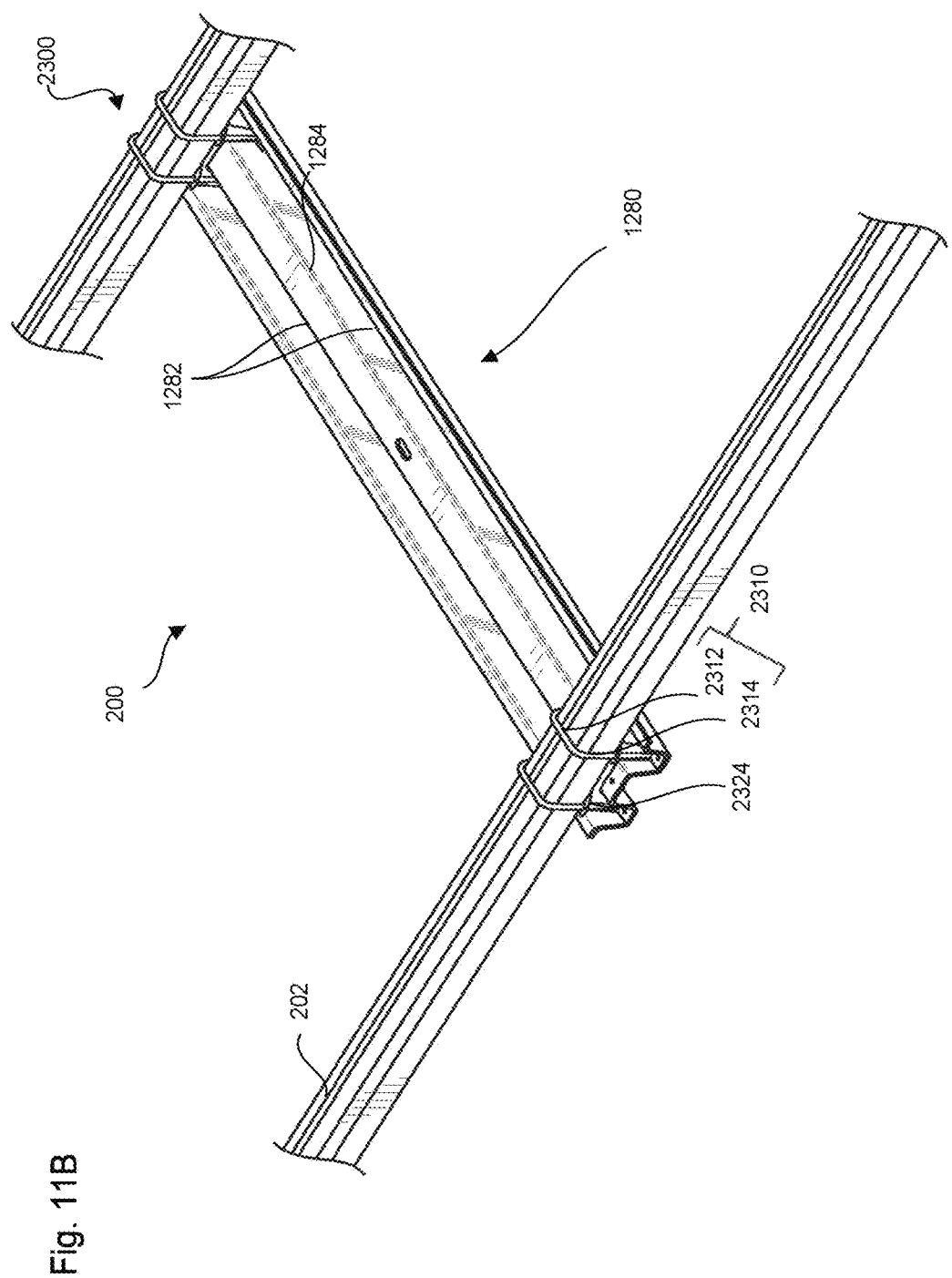
FIG. 11B is an assembled perspective view of the mounting assembly with the staple assembly.

Staple Assembly 2300—FIGS. 11A-11B

FIGS. 11A-11B are an exploded and an assembled perspective views of the mounting assembly with a staple assembly 2300.

In another alternative non-limiting illustrative example, the floating rail snap brackets 1300 can be replaced by a staple assembly 2300 that is fixable to the extremities of the floating mounting plate 1280.

The staple assembly 2300 can include a pair of staples 2310 that is inserted on the rail 202, a bracket 2320 that receives the bottom side 2024 of the rail 202, and a table 2330 that receives the bracket 2320 and is fixable onto the floating mounting plate 1280.

Each staple of the pair of staples 2310 can be a square staple with a staple top member 2312 that contacts the top side 2022 of the rail 202 and a pair of staple lateral members 2314 that protrudes from the staple top member 2312 to run along the internal and external sides 2020, 2028 of the rail 202 and extend over the bottom side 2024 of rail 202.

The bracket 2320 can include a bracket plate 2322 that contacts the bottom side 2024 of the rail 202, and four bracket tongues 2324 that protrudes upwardly from four corners of the bracket plate 2322, wherein each bracket tongue of the four bracket tongues 2324 has a bracket tongue hole 2325.

The table 2330 can include a table top 2332 that contacts the bracket plate 2322, four table legs 2334 that protrudes downwardly from four corners of the table top 2332, and four table feet 2336 that terminate the four table legs 2334, wherein each table foot of the four table feet 2336 has a table foot hole 2335.

To affix the rail 202 to the mounting surface 102, the operator can affix the staple assembly 2300 onto the rail 202 and then affix the table 2330 of the staple assembly 2300 onto the floating mounting plate 1280.

To affix the staple assembly 2300 on the trail 202, the operator can place the bracket plate 2322 against the bottom side 2024 of the rail 202 and the table top 2332 against the bracket plate 2322 and insert the pair of staples 2310 onto the rail 202 and pass the pair of staple lateral members 2314 through the bracket tongue holes 2325 and the table foot holes 2335.

To affix the table 2330 of the staple assembly 2300 onto the floating mounting plate 1280, the operator can place the four table feet 2336 onto the pair of lower support surfaces 1282 of the floating mounting plate 1280, and insert the pair of staple lateral members 2314 through the plurality of affixing holes 1286 of the floating mounting plate 1280. To secure the staple assembly 2300 to floating mounting plate 1280 fastening devices, e.g. bolts and nuts, rivets, welding points, and/or glue points, can be inserted between the pair of staple lateral members 2314 and the floating mounting plate 1280.

Figure 12A:
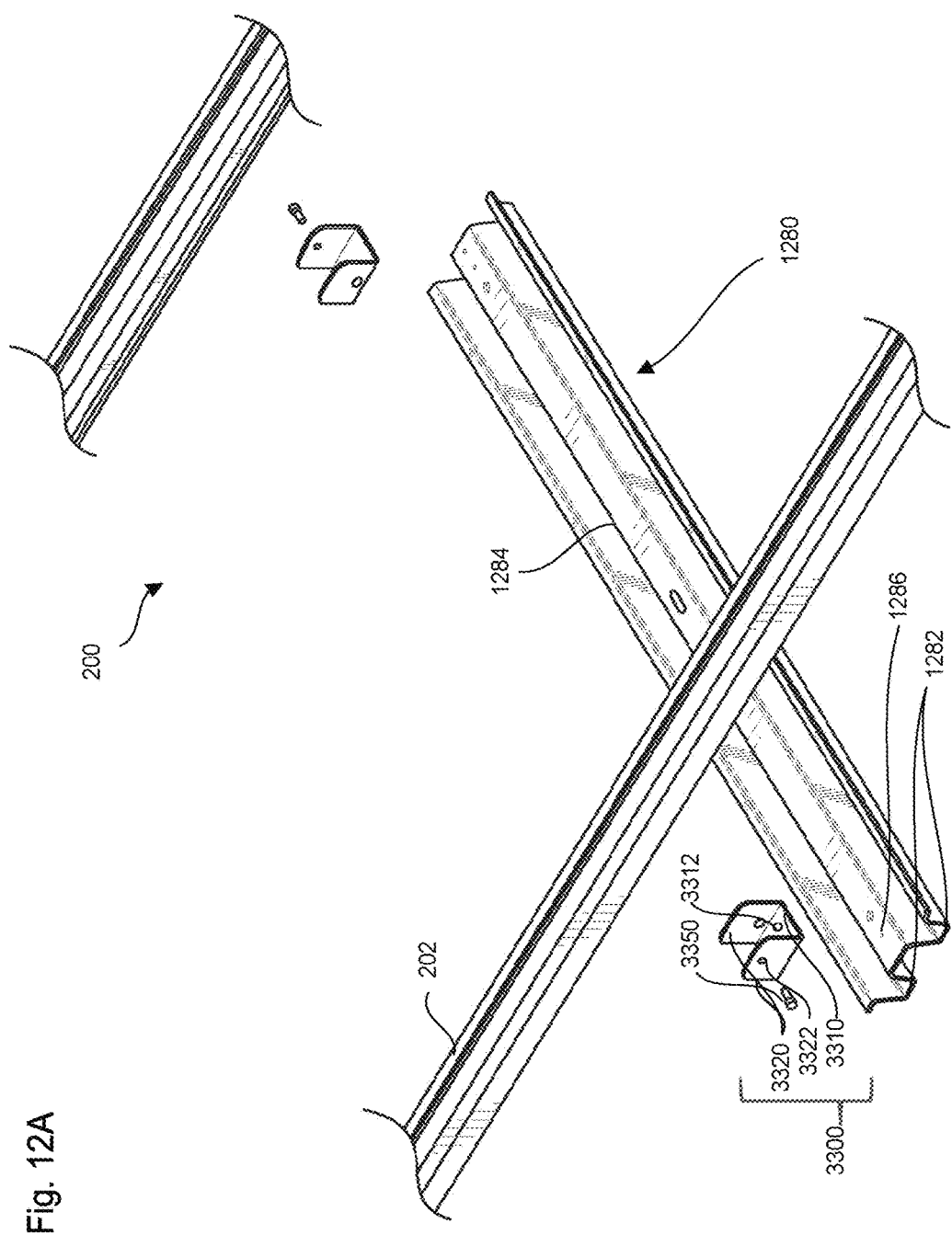
FIG. 12A is an exploded perspective view of the mounting assembly with a U-bracket.
Figure 12B:
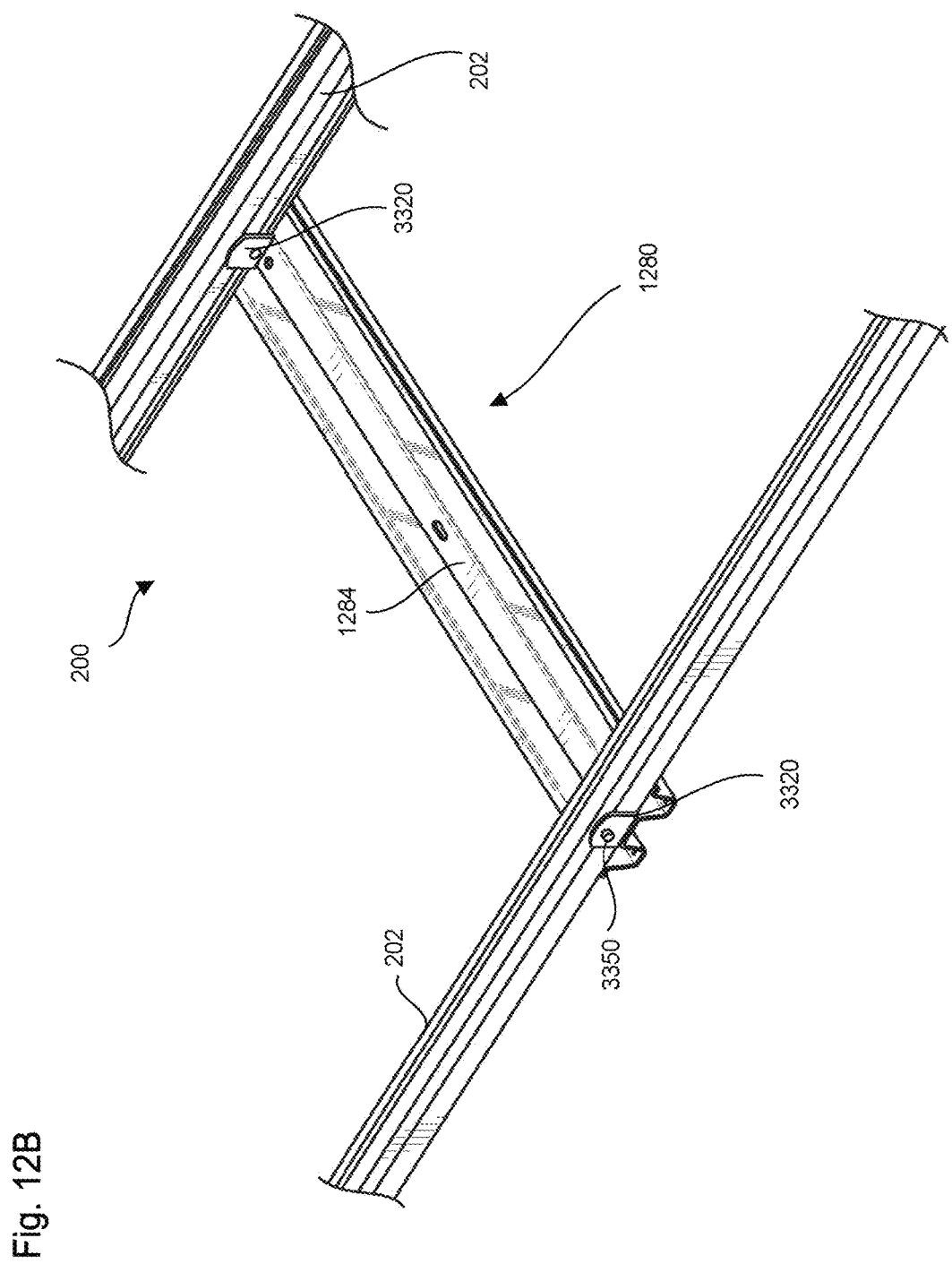
FIG. 12B is an assembled perspective view of the mounting assembly with the U-bracket.

U-Bracket 3300—FIGS. 12A-12B

FIGS. 12A-12B are an exploded and an assembled perspective views of the mounting assembly with a U-bracket 3300.

In another alternative non-limiting illustrative example, the floating rail snap bracket 1300 or the staple assembly 2300 can be replaced by a U-bracket 3300 that is fixable to the extremities of the floating mounting plate 1280.

The U-bracket 3300 can include a bottom wall 3310, and a pair of lateral walls 3320 that protrudes upwardly and substantially perpendicularly from the bottom wall 3310, wherein each lateral wall of the pair of lateral walls 3320 include a lateral through hole 3322.

In addition, the bottom wall 3310 of the U-bracket 3300 can include a plurality of affixing holes 3312 that matches the plurality of affixing holes 1286 of the floating mounting bracket 1280.

To affix the rail 202 to the mounting surface 102, the operator can affix the U-bracket 3300 onto the floating mounting plate 1280 and then affix the rail 202 onto the U-bracket 3300.

To affix the U-bracket 3300 onto the floating mounting plate 1280, the operator can place the bottom wall 3310 of the U-bracket 3300 against the upper support surface 1284 of the floating mounting plate 1280. The operator can secure the U-bracket 3300 onto the floating mounting plate 1280 by aligning the plurality of affixing holes 3312 of the bottom wall 3310 with the plurality of affixing holes 1286 of the floating mounting plate 1280 and inserting fastening devices, e.g. bolts and nuts, rivets, welding points, and/or glue points, through the plurality of affixing holes 3312, 1286.

To affix the rail 202 onto the U-bracket 3300, the operator can insert the rail 202 into the U-bracket 3300 to have the bottom side 2024 of the rail 202 in contact with the bottom wall 3310 of the U-bracket 3300 and to have the external and internal sides 2028, 2020 of the rail 202 between the pair of lateral walls 3320. In addition, to secure the rail 202 inside the U-bracket 3300, an U-bracket fastener 3350, e.g. a bolt, a screw, or the like, can be inserted through the lateral through hole 3322 of one of the lateral of the pair of lateral walls 3320 and through the recess opening 2043 of the internal recess 2040 and threaded into the recess threaded hole 2048 of the recess wall 2046 to affix the internal side 2028 of the rail 202 against the lateral walls 3320 of U-bracket 3300.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mounting assembly to mount solar modules on a mounting surface, the mounting assembly comprising:
   a plurality of rails that support the solar modules, each rail of the plurality of rails including:
      an internal side with an internal recess, and
      an external side opposite to the internal side with a lip that protrudes outwardly; and
   a plurality of roof mounting assemblies that secure the plurality of rails onto the mounting surface, each roof mounting assembly of the plurality of roof mounting assemblies including:
      a mounting block that is fixable to the mounting surface,
      a mounting plate that is fixable to the mounting block, and
      a pair of rail snap brackets respectively formed at a first end and a second end of the mounting plate that receives and locks the plurality of rails in place, each rail snap bracket of the pair of rail snap brackets including:
         a first support wall that protrudes from the mounting plate,
         a pair of notches that protrude from the first support wall and are configured to engage the internal recess of the rail to lock the rail in place, wherein each notch of the pair of notches includes
            a slanted portion with respect to the first support wall that contacts the rail and flexes when the rail is received in the rail snap bracket, and
            a nonplanar portion adjacent to the slanted portion that is receivable in the internal recess when the rail is locked in place in the rail snap bracket,
         a second support wall that protrudes from the first support wall between the pair of notches, and
         a hook that is placed along an outward end of the second support wall and that is configured to engage the lip of the rail when the rail is being rotated toward the second support wall and the pair of notches flex inwardly to position the nonplanar portion of each pair of notches into the internal recess and lock the internal side of the rail against the first support wall of the rail snap bracket and a bottom side of the rail against the second support wall of the rail snap bracket.

2. The mounting assembly of claim 1, wherein the notch further includes a planar portion that seats on a stop of the internal recess.

3. The mounting assembly of claim 1, wherein the rail snap bracket further includes a tongue with a tongue hole and a tongue fastener inserted through the tongue hole and threaded in the internal recess to further lock the rail in the rail snap bracket.

4. The mounting assembly of claim 1, wherein the mounting block includes a counter bore hole to receive a mounting block fastener that affixes the mounting block on the mounting surface.

5. The mounting assembly of claim 1, further includes a flashing positioned between the mounting surface and the mounting block that prevents water infiltration to the mounting surface.

6. The mounting assembly of claim 1, wherein the solar modules comprise a frame.

7. The mounting assembly of claim 1, wherein the mounting surface is a roof.

8. A mounting assembly to mount frames on a mounting surface, the mounting assembly comprising:
- a plurality of rails that support the frames, each rail of the plurality of rails including:
  - a top side with a top recess,
  - an internal side adjacent to the top side with an internal recess, and
  - an external side opposite to the internal side with a lip that protrudes outwardly;
- a plurality of roof mounting assemblies to affix the plurality of rails onto the mounting surface, each roof mounting assembly of the plurality of roof mounting assemblies including:
  - a mounting block that is fixable to the mounting surface,
  - a mounting plate that is fixable to the mounting block, and
  - a pair rail snap brackets respectively formed at a first end and a second end of the mounting plate that receives and locks the plurality of rails in place, each rail snap bracket including:
    - a first support wall that protrudes from the mounting plate,
    - a pair of notches that protrude from the first support wall and are configured to engage the internal recess of the rail to lock the rail, wherein each notch of the pair of notches includes
      - a slanted portion with respect to the first support wall that contacts the rail and flexes when the rail is received in the rail snap bracket, and
      - a nonplanar portion adjacent to the slanted portion that is receivable in the internal recess when the rail is locked in place in the rail snap bracket,
    - a second support wall that protrudes from the first support wall between the pair of notches,
    - a hook that is placed along an outward end of the second support wall and that is configured to engage the lip of the rail when the rail is being rotated toward the second support wall and the pair of notches flex inwardly to position the nonplanar portion of each pair of notches into the internal recess and lock the internal side of the rail against the first support wall of the rail snap bracket and a bottom side of the rail against the second support wall of the rail snap bracket; and
- a plurality of frame connectors to affix the frames onto the plurality of rails, each frame connector of the plurality of frame connectors including:
  - a guide rail in contact with the top side of the rail,
  - at least one pair of notches that protrudes from the guide rail and locks the solar panels, and
  - a frame connector fastener with a head that anchors the top recess of the top side and a body that threads into the guide rail.

9. The mounting assembly of claim 8, wherein the guide rail includes:
- a guide rail base,
- a threaded hole placed on the guide rail base that receives the body of the frame connector fastener,
- an internal guide rail wall that protrudes from the guide rail base and faces the internal side of the rail, and
- an external guide rail wall that protrudes from the guide rail base and faces the external side of the rail.

10. The mounting assembly of claim 9, wherein each notch of the at least one pair of notches includes a first pair of supporting walls that protrudes from the guide rail base and a pair of slanted portions with respect to the first support wall that is cut out from the first pair of supporting walls.

11. The mounting assembly of claim 10, wherein each frame of the plurality of frames includes a ridge that is locked against the guide rail base by the pair of slanted portions of the at least one pair of notches.

12. The mounting assembly of claim 11, wherein the frame connector includes a protrusion placed between the at least one pair of notches that is insertable in a ridge hole of the ridge.

13. The mounting assembly of claim 12, wherein the plurality of frames supports a plurality of solar modules.

14. The mounting assembly of claim 13, wherein the mounting surface is a roof.

15. A mounting assembly to mount frames on a mounting surface, the mounting assembly comprising:
- a plurality of rails that support the frames, each rail of the plurality of rails including:
  - an open end,
  - a top side with a top recess,
  - an internal side adjacent to the top side with internal recess, and
  - an external side opposite to the internal side with a lip that protrudes outwardly;
- a plurality of rail connectors to connect the plurality of rails from end to end, each rail connector of the plurality of rail connectors including:
  - an inner rail that receives a first open end of a first rail of the plurality of rails and a second open end of a second rail of the plurality of rails;
- a plurality of roof mounting assemblies to affix the plurality of rails onto the mounting surface, each roof mounting assembly of the plurality of roof mounting assemblies including:
  - a mounting block that is fixed to the mounting surface,
  - a mounting plate that is fixed to the mounting block, and
  - a pair rail snap brackets respectively formed at a first end and a second end of the mounting plate that receives and locks the plurality of rails in place, each rail snap bracket including:
    - a first support wall that protrudes from the mounting plate,
    - a pair of notches that protrude from the first support wall and are configured to engage the internal recess of the rail to lock the rail, wherein each notch of the pair of notches includes
      - a slanted portion with respect to the first support wall that contacts the rail and flexes when the rail is received in the rail snap bracket, and a nonplanar portion adjacent to the slanted portion that is receivable in the internal recess when the rail is locked in place in the rail snap bracket, a second support wall that protrudes from the first support wall between the pair of notches, a hook that is placed along an outward end of the second support wall and that is configured to engage the lip of the rail when the rail is being rotated toward the second support wall and the pair of notches flex inwardly to position the nonplanar portion of each pair of notches into the internal recess and lock the internal side of the rail against the first support wall of the rail snap bracket and a bottom side of the rail against the second support wall of the rail snap bracket; and a plurality of frame connectors that affix the frames onto the plurality of rails.

16. The mounting assembly of claim 15, wherein the rail connector further includes a support bracket.

17. The mounting assembly of claim 16, wherein the rail connector further includes an adjustable foot configured to be inserted in a lower portion of the support bracket to adjust a distance between the mounting surface and the rail.

18. The mounting assembly of claim 15, wherein the rail connector further includes a locking mechanism to lock the first rail and the second rail onto the inner rails.

19. The mounting assembly of claim 18, wherein the locking mechanism includes a pair of triggers located below the inner rail, and a pair of protrusions actuated by the pair of triggers to retract and protrude from a side wall of the inner rail and be inserted into a first hole of the first rail and in a second hole of the second rail.

* * * * *